(12) United States Patent
Ehrlich et al.

(10) Patent No.: US 7,298,568 B2
(45) Date of Patent: Nov. 20, 2007

(54) SYSTEMS AND METHODS FOR USING WORF TO IDENTIFY BURST PATTERNS FOR REPAIR

(75) Inventors: Richard M. Ehrlich, Saratoga, CA (US); Thorsten Schmidt, Milpitas, CA (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 100 days.

(21) Appl. No.: 11/082,120

(22) Filed: Mar. 16, 2005

(65) Prior Publication Data

US 2005/0157416 A1    Jul. 21, 2005

Related U.S. Application Data

(63) Continuation of application No. 10/923,662, filed on Aug. 20, 2004, now Pat. No. 7,262,930.

(60) Provisional application No. 60/496,459, filed on Aug. 20, 2003, provisional application No. 60/496,462, filed on Aug. 20, 2003, provisional application No. 60/496,477, filed on Aug. 20, 2003.

(51) Int. Cl.
*G11B 5/09* (2006.01)
*G11B 27/36* (2006.01)
*G11B 21/02* (2006.01)

(52) U.S. Cl. ............................ 360/53; 360/31; 360/75
(58) Field of Classification Search .................... None
See application file for complete search history.

(56) References Cited

U.S. PATENT DOCUMENTS

| 5,381,281 A * | 1/1995 | Shrinkle et al. ......... 360/77.08 |
| 6,392,831 B1 * | 5/2002 | Yeo et al. ..................... 360/53 |
| 6,628,471 B1 * | 9/2003 | Min et al. ..................... 360/75 |

* cited by examiner

*Primary Examiner*—Thang V. Tran
*Assistant Examiner*—Daniell L. Negrón
(74) *Attorney, Agent, or Firm*—Fliesler Meyer LLP

(57) ABSTRACT

The misplacement of a servo burst during a servowriting or self-servowriting process can be corrected by erasing and re-writing that burst. In addition, WORF information of a track can be saved in memory for future servowriting and/or can be utilized to compare with a pre-determined threshold to identify servo bursts to be repaired. Alternatively, a batch writing approach can be used to minimize the time needed to re-write misplaced bursts. This description is not intended to be a complete description of, or limit the scope of, the invention. Other features, aspects, and objects of the invention can be obtained from a review of the specification, the figures, and the claims.

8 Claims, 27 Drawing Sheets

SYSTEMS AND METHODS FOR USING WORF TO IDENTIFY BURST PATTERNS FOR REPAIR

CLAIM OF PRIORITY

This application claims priority from the following application, which is hereby incorporated by reference in its entirety:

U.S. patent application Ser. No. 10/923,662, entitled SYSTEMS AND METHODS FOR REPAIRABLE SERVO BURST PATTERNS by Richard M. Ehrlich, filed Aug. 20, 2004.

FIELD OF THE INVENTION

The present invention relates to servowriting processes and devices.

A general purpose of an embodiment of the present invention includes providing a method to support repairable servowriting comprising calculating a first set of WORF and/or PES information for one or more servo tracks on a surface of a rotating medium, comparing the first set of WORF and/or PES information for the one or more servo tracks with a pre-determined threshold, repairing a servo burst and/or a boundary of the servo burst on the one or more servo tracks via a read and/or write element of a read/write head if the WORF and/or PES information exceeds the threshold, calculating a second set of WORF and/or PES information for the one or more servo tracks; and storing the second set of WORF and/or PES information for retrieval during self-servowriting.

BACKGROUND

Advances in data storage technology have provided for ever-increasing storage capability in devices such as DVD-ROMs, optical drives, and disk drives. In hard disk drives, for example, the width of a written data track has decreased due in part to advances in read/write head technology, as well as in reading, writing, and positioning technologies. The narrowing of data tracks results in higher density drives, which is good for the consumer but creates new challenges for drive manufacturers. As the density of data increases, the tolerance for error in the position of a drive component such as a read/write head decreases. As the position of such a head relative to a data track becomes more important, so too does the placement of information, such as servo data, that is used to determine the position of a head relative to a data track.

DETAILED DESCRIPTION

Figure 1:
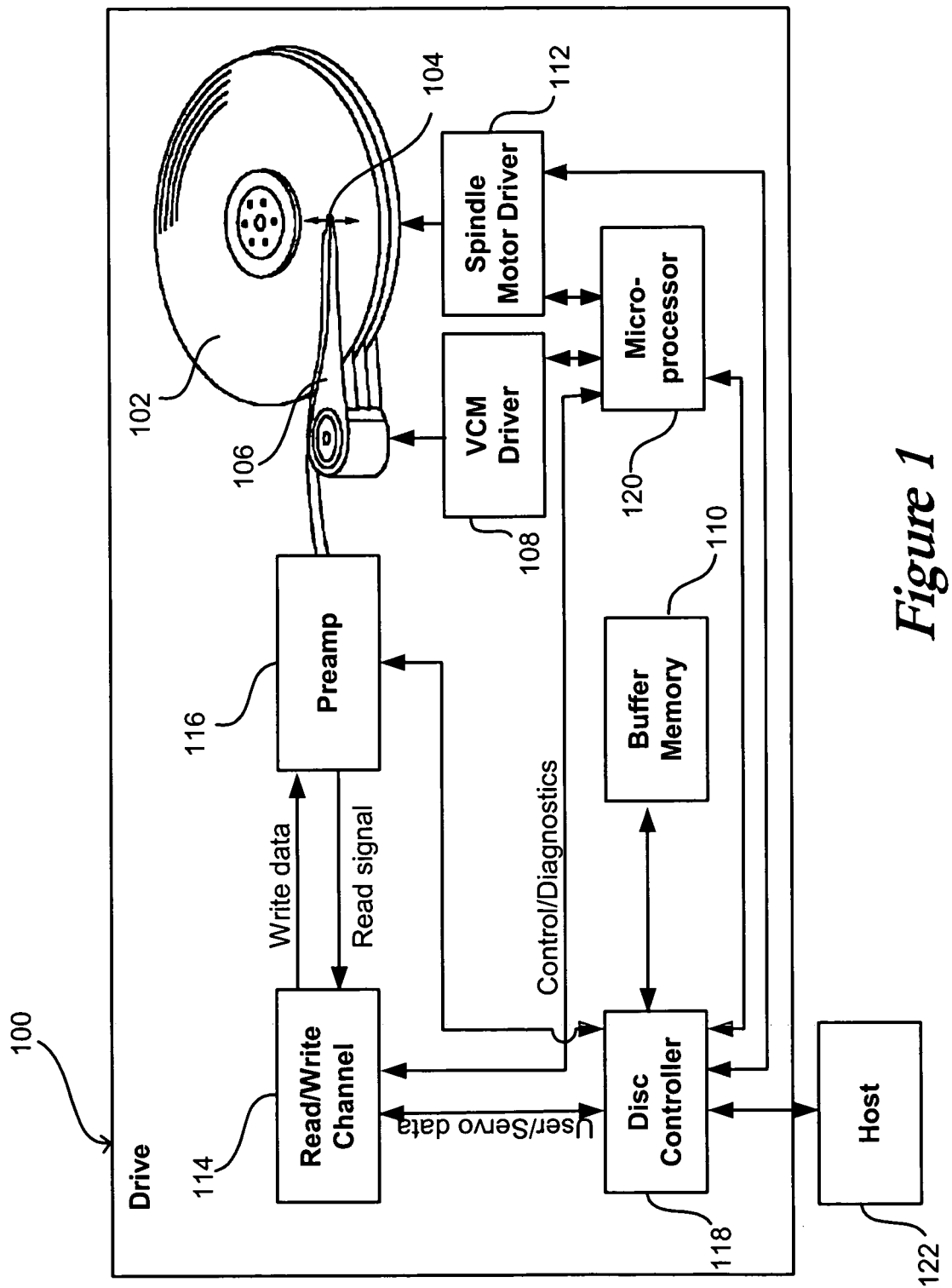
FIG. 1 is a diagram showing components of a disk drive that can be used in accordance with embodiments of the present invention.

Systems and methods in accordance with embodiments of the present invention can be used when servowriting, or self-servowriting, a rotatable storage medium in a data storage device, such as a hard disk drive. For example, a typical disk drive 100, as shown in FIG. 1, includes at least one magnetic disk 102 capable of storing information on at least one of the surfaces of the disk. A closed-loop servo system can be used to move an actuator arm 106 and data head 104 over the surface of the disk, such that information can be written to, and read from, the surface of the disk. The closed-loop servo system can contain, for example, a voice coil motor driver 108 to drive current through a voice coil motor (not shown) in order to drive the actuator arm, a spindle motor driver 112 to drive current through a spindle motor (not shown) in order to rotate the disk(s), a microprocessor 120 to control the motors, and a disk controller 118 to transfer information between the microprocessor, buffer, read channel, and a host 122. A host can be any device, apparatus, or system capable of utilizing the data storage device, such as a personal computer or Web server or consumer electronics device. The drive can contain at least one processor, or microprocessor 120, that can process information for the disk controller 118, read/write channel 114, VCM driver 108, or spindle driver 112. The microprocessor can also include a servo controller, which can exist as an algorithm resident in the microprocessor 120. The disk controller 118, which can store information in buffer memory 110 resident in the drive, can also provide user data to a read/write channel 114, which can send data signals to a current amplifier or preamp 116 to be written to the disk(s) 102, and can send servo and/or user data signals back to the disk controller 118.

Figure 2:
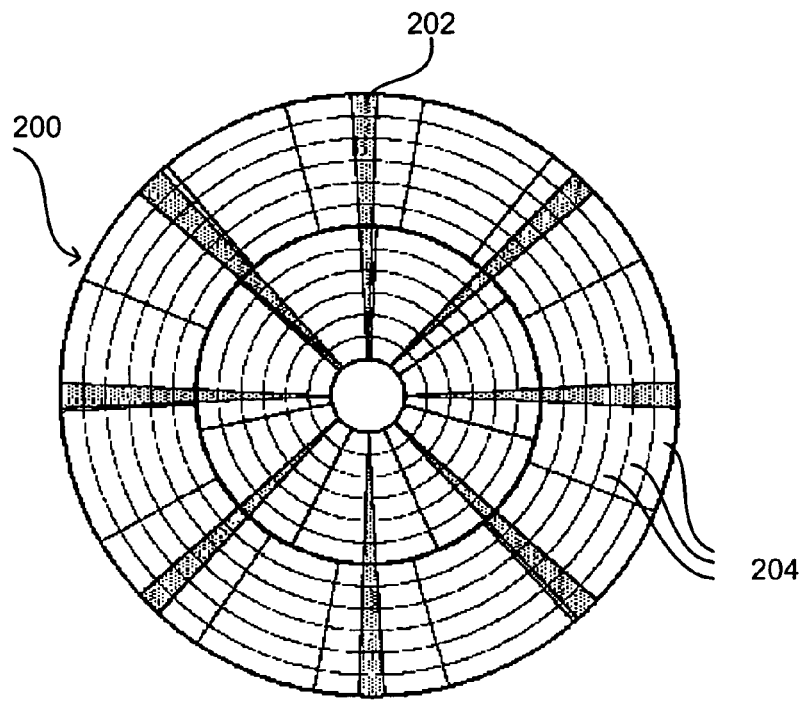
FIG. 2 is a diagram showing an example of a data and servo format for a disk in the drive of FIG. 1.

The information stored on such a disk can be written in concentric tracks, extending from near the inner diameter of the disk to near the outer diameter of the disk 200, as shown in the example disk of FIG. 2. In an embedded servo-type system, servo information can be written in servo wedges 202, and can be recorded on tracks 204 that can also contain data. In a system where the actuator arm rotates about a pivot point such as a bearing, the servo wedges may not extend linearly from the inner diameter (ID) of the disk to the outer diameter (OD), but may be curved slightly in order to adjust for the trajectory of the head as it sweeps across the disk.

Figure 3:
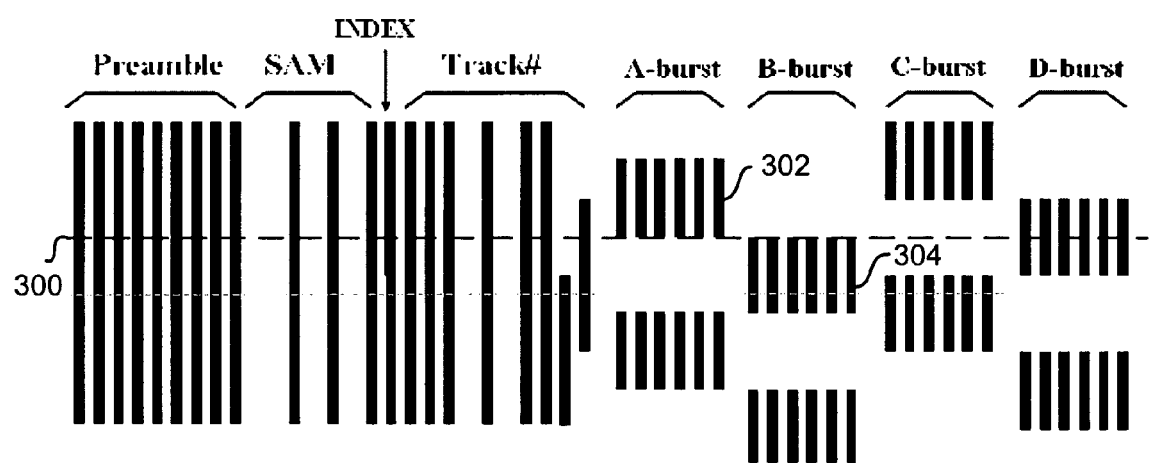
FIG. 3 is a diagram showing servo information that can be written to the tracks shown in FIG. 2.

The servo information often includes positioning bursts referred to herein as "servo bursts." The servo information can be positioned regularly about each track, such that when a data head or read element reads the servo information, a relative position of the head can be determined that can be used by a servo processor to adjust the position of the head relative to the track. For each servo wedge, this relative position can be determined in one example as a function of the target location, a track number read from the servo wedge, and the amplitudes or phases of the bursts, or a subset of those bursts. The measure of the position of a head or element, such as a read/write head or element, relative to a target track, will be referred to herein as a position-error signal (PES). For example, a centerline 300 for a given data track can be "defined" by a series of burst edges or burst boundaries, such as a burst boundary defined by the lower edge of A-burst 302 and the upper edge of B-burst 304 in FIG. 3. For example, if a read head evenly straddles the A-burst and the B-burst, then servo demodulation circuitry in communication with the head can produce equal amplitude measurements for the two bursts, as the portion of the signal coming from the A-burst above the centerline is approximately equal in amplitude to the portion coming from the B-burst below the centerline. The resulting computed PES can be zero if the track defined by the A-burst/B-burst (A/B) boundary is the center of a data track, or a track centerline. If the head is too far towards the outer diameter of the disk, or above the centerline in the figure, then there will be a greater contribution from the A-burst that results in a non-zero PES value, such as a "negative" PES. Using the negative PES, the servo controller could direct the voice coil motor to move the head toward the inner diameter of the disk and closer to its desired position relative to the centerline. This can be done for each set of burst edges defining the shape of that track about the disk.

The PES scheme described above is one of many possible schemes for combining the track number read from a servo wedge and the phases or amplitudes of the servo bursts. Many other schemes are possible that can benefit from embodiments in accordance with the present invention.

A problem that exists in the reading and writing of servo patterns involves the misplacement, or offset, of a read/write head with respect to the ideal and/or actual position of a track. It is impossible to perfectly position a head with respect to a track for each rotation of a disk, as there is almost always a noticeable offset between the desired position and the actual position of the head with respect to the disk. This can cause problems when writing servo patterns, as each portion of the pattern can be slightly misplaced. This can lead to what is referred to as "written-in runout." Written-in runout can be thought of as the offset between the actual centerline, or desired radial center, of a track and the centerline that would be determined by a head reading the written servo pattern. Written-in runout can lead to servo performance problems, wasted space on a disk and, in a worst case, unrecoverable or irreparably damaged data.

FIGS. 4(*a*)-4(*f*) depict the progression of several servowriting steps of an exemplary servowriting process. The pattern shown in these figures is commonly referred to in the industry as a 3-pass-per-track, trimmed-burst pattern, for reasons described below. Using the nomenclature of this document, one could refer to the pattern as a "3-servowriting-step-per-track, trimmed-burst" pattern. Each figure depicts a small portion of the surface of a disk. This portion can contain several servo tracks, extending radially on the disk and vertically in the figures, and can cover the space of a single servo wedge, circumferentially on the disk and horizontally in the figures. A typical drive can have tens of thousands of servo tracks, and over one hundred wedges per revolution. In the figures, the black areas indicate portions of the surface of the disk that have been magnetized in one direction. White areas have been magnetized in another direction, typically in a direction opposite to that of the black areas. For a drive that uses longitudinal recording, the two directions can be in the positive and negative circumferential directions. For a drive that uses vertical recording technology (also sometimes referred to in the industry as "perpendicular recording"), the two directions can be perpendicular to the recording surface, such as would be "in" and "out" of the page for the illustrations of FIGS. 4(*a*)-(*f*). These simplified figures do not show effects of side writing of the write element, which can produce non-longitudinal magnetization and erase bands. Such effects are not of primary importance to the discussion herein.

In FIG. 4(*a*), the result of a single servowriting step is shown. From that step, the servowriting head (passing from left to right in the figure) has written an exemplary servo pattern containing a preamble, followed by a servo-address mark (SAM), followed by an INDEX-bit, and then a track number, as is known in the art. Other information can be written to the servo pattern in addition to, or in place of, the information shown in FIG. 4(*a*). An INDEX-bit, for example, is one piece of information that can be used to give the servo an indication of which wedge is wedge-number zero, useful for determining circumferential position. The track number, which can be a graycoded track-number, can later be used by the servo to determine the coarse radial position of the read/write (R/W) head. Following the track number, the head writes one of four servo bursts, in this case what will be referred to as a C-burst, which can later be used by a servo to determine the fine (fractional track) radial position of a R/W head. The number of servo bursts used can vary with servo pattern. The burst that is written can be, for example, the one that is in-line with the digital information.

The width of the written track can be determined by the magnetic write-width of the write element of the servowriting head.

Figure 4A:
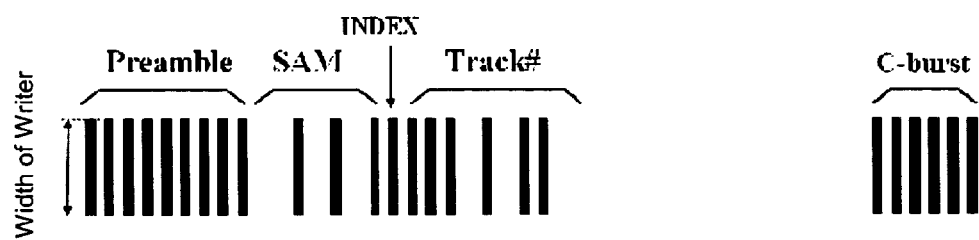
FIGS. 4(a)-(f) are diagrams of a servo-burst pattern being written over a progression of servowriting steps.
Figure 4B:
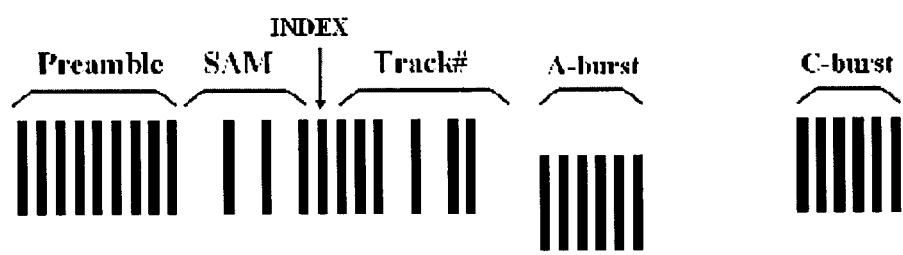

FIG. 4(b) shows the result of a second servowriting step of the servowriting head. All that has been added in the second step is an additional burst, in this case referred to as an A-burst. The A-burst is displaced longitudinally from both the digital information and the C-burst, to prevent any overlap in the longitudinal direction. The A-burst is also displaced by approximately one-half of a servo-track in the radial direction.

Figure 4C:
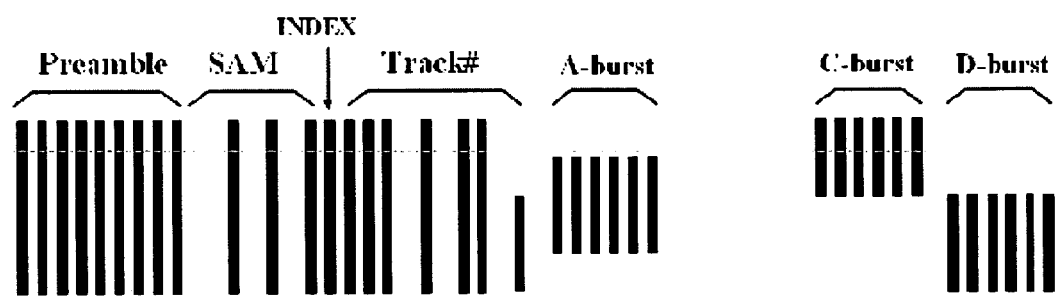

FIG. 4(c) shows the magnetization pattern after three servowriting steps of the servowriting head. The new portion of the pattern has been written with the servowriting head displaced another half servo track radially, for a total displacement of one servo-track, or two-thirds of a data-track, from the position of the head during the first servowriting step. New digital information has been written, including the same preamble, SAM, and INDEX-bit, as well as a new track number. A D-burst was added during the third servowriting step, and the C-burst was "trimmed." The C-burst was trimmed by "erasing" the portion of the C-burst under the servowriting head as the head passed over the burst on the third servowriting step. As long as the servowriting head is at least two-thirds of a data-track in radial extent, the digital information will extend across the entire radial extent of the servowritten pattern. This trimming of the C-burst and writing of the D-burst created a common edge position or "boundary" between the two bursts.

Figure 4D:

In FIG. 4(d), a B-burst has been added and the A-burst trimmed in the fourth servowriting step of the servowriter. At a point in time after the servowriting is complete, such as during normal operation of the disk drive, the upper edge of the B-burst and the lower edge of the A-burst can be used by the servo, along with the graycoded track-number whose radial center is aligned with the burst edges, to determine the R/W head position when it is in the vicinity of the center of that servo track. If a reader evenly straddles the A-burst and the B-burst, the amplitude of the signals from the two bursts will be approximately equal and the fractional Position-Error Signal (PES) derived from those bursts will be about 0. If the reader is off-center, the PES will be non-zero, indicating that the amplitude read from the A-burst is either greater than or less than the amplitude read from the B-burst, as indicated by the polarity of the PES signal. The position of the head can then be adjusted accordingly. For instance, a negative PES might indicate that the amplitude read from the A-burst is greater than the amplitude read from the B-burst. In this case, the head is too far above the center position (using the portion of the pattern in the figure) and should be moved radially downward/inward until the PES signal is approximately 0. It should be noted that for other portions of the pattern a B-burst could be above an A-burst, resulting in a smaller amplitude contribution coming from the A-burst when the head in too near the outer diameter of the disk.

Figure 4E:
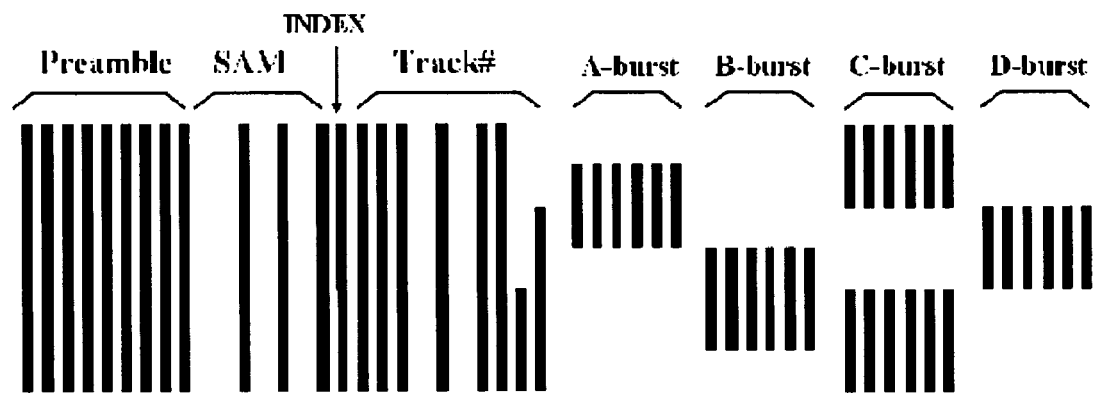
Figure 4F:
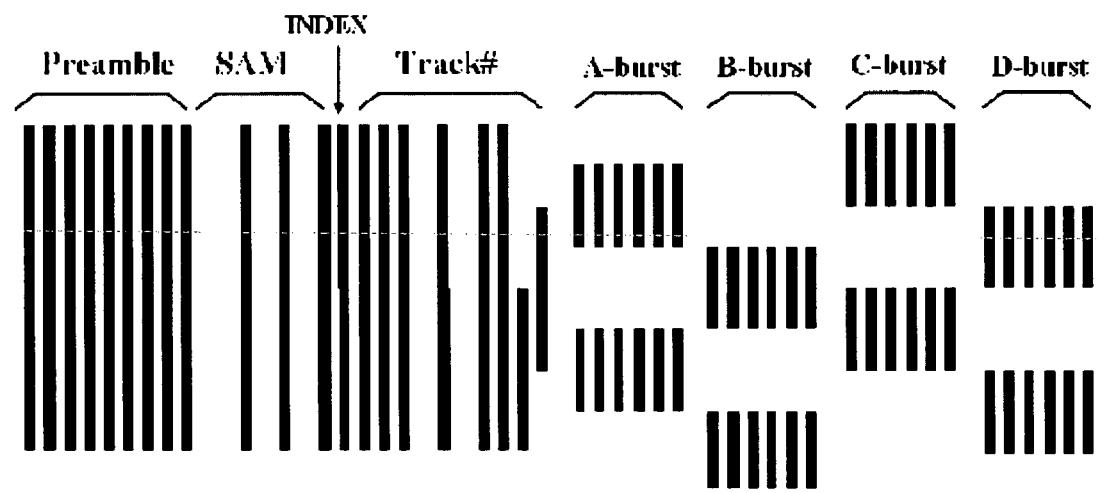

FIGS. 4(e) and 4(f) show the results of subsequent steps of the servowriting process, which has produced a number of servo tracks. After the first step in this process, each subsequent step writes one servo burst in a wedge and trims another. Every second step also writes digital information, including the SAM and track number. Between servowriting steps, the servowriting head is stepped by one-half servo track radially, either toward the inner diameter (ID) or outer diameter (OD) of the disk, depending on the radial direction used to write the servo information. A seek typically takes anywhere from one quarter to one half of the time it takes for the disk to make one revolution. The process of writing the servo pattern for each step typically takes one or two full revolutions to write all of the wedges in that pass. It is possible that completing the burst writing and trimming for a single servowriting step can take more than two revolutions, but a maximum of two revolutions (one to write the new burst, and another to trim a previously-written burst) will be considered for the discussion below.

Using such an algorithm, servowriting can take about 1.25-2.5 revolutions per servowriting step. Since there are two servowriting steps per servo-track in this example, and 1.5 servo tracks per data-track, such a process requires 3 servowriting steps per data-track, or 3.75-7.5 revolutions per data-track. For purposes of subsequent discussion only, it will be assumed that the process takes 4 revolutions per data-track (a relatively low bound).

A disk drive can have tens of thousands of data tracks. With 100,000 data-tracks and a spin-speed of 5400 RPM (90 Hz), for example, the process would take 4,444 seconds, or about 75 minutes. If the process is carried out on an expensive servowriter, this can add substantially to the cost of the drive. Thus, drive manufacturers are motivated to use self-servowriting techniques to reduce or eliminate the time that a drive must spend on a servowriter.

One such technique uses a media-writer to write servo patterns on a stack of disks. Each disk is then placed in a separate drive containing multiple blank disks, such that the drive can use the patterned disk as a reference to re-write servo patterns on all of the other disk surfaces in the drive. The media-writer can be an expensive instrument, and it may still take a very long time to write a reference pattern on the stack of disks. However, if a stack contains 10 blank disks, for example, then the media-writer can write the reference pattern for 10 drives in the time that it would have taken to servowrite a single drive. This scheme is a member of a class of self-servowriting techniques commonly known as "replication" self-servowriting.

A typical replication process, in which a drive servos on the reference pattern and writes final servo patterns on all surfaces, can take place while the drive is in a relatively inexpensive test-rack, connected to only a power-supply. The extra time that it takes is therefore usually acceptable.

Another class of self-servowriting techniques is known as "propagation" self-servowriting. Schemes in this class differ from those in the "replication" class in the fact that the wedges written by the drive at one point in the process are later used as reference wedges for other tracks. These schemes are thus "self-propagating". Typically, such schemes require a R/W head that has a large radial offset between the read and write elements, so that the drive can servo with the read element over previously-written servo wedges while the write element is writing new servo wedges. In one such application, a servowriter is used for a short time to write a small "guide" pattern on a disk that is already assembled in a drive. The drive then propagates the pattern across the disk. In this type of self-servowriting operation, previously written tracks can later serve as reference tracks.

Many self-servowriting techniques require considerably more than four disk revolutions per data-track written, as the drive must spend considerable time before each servowriting step determining the written-in runout of the corresponding reference track, so that the servowriting head can be prevented from following that runout while writing the final servo pattern. Techniques exist which allow tracks of servo information to be made substantially circular, despite the fact that the reference information is not perfectly circular.

The information used to remove written-in runout from the track can be calculated in one approach by examining a number of parameters over a number of revolutions. These parameters can include wedge offset reduction field (WORF) data values calculated by examining the measured PES over a number of revolutions of a track, as well as the servo loop characteristics. A measurement can be made to characterize servo loop characteristics, which can be combined with the observed PES in order to determine the written-in runout of the reference track. Because the servo typically suffers both synchronous and non-synchronous runout (sometimes referred to in the industry as "repeatable" runout (RRO) and "non-repeatable" runout (NRRO), respectively), any measurement intended to determine the synchronous runout can be affected by the non-synchronous runout. If many revolutions of PES data are observed and combined (one possible approach to combine is to synchronously average the PES data, another possible approach is outlined in U.S. Pat. Nos. 6,069,764, 6,437,936, 6,563,663 and 6,449,116), the effects of the non-synchronous runout can lessen, leaving substantially only synchronous runout. Observing many revolutions of PES data, however, can add significantly to the time required for determination of the written-in runout. Process engineers may need to balance the cost and benefit of additional revolutions of PES data collection in determination of WORF values.

The computed written-in runout values for each servo wedge can be written into the servo wedges themselves for later use by the servo, or can be kept in drive microcontroller memory for immediate use. During a self-servowriting operation, the drive may use the latter option by measuring the written-in runout on a reference track and applying it to the servo by the use of a table in microcontroller memory. Additional revolutions of PES measurements for the reference track can be used to reduce the effects of non-synchronous runout.

Techniques for determining and removing written-in runout of a track will hereinafter be referred to as WORF (Wedge Offset Reduction Field) technology. If, for example, a drive spends 5 revolutions to determine the written-in runout of each reference track before writing the corresponding final wedges, that would add 15 revolutions to the writing time of each data-track (5 extra revolutions per servowriting step, times 3 servowriting steps per data-track), bringing the total time per data-track to 19 revolutions.

Even though the self-servowriting time may be as much as about five times as long as the time necessary to servowrite a drive on a servowriter (19 revolutions/data-track, versus 4 revolutions/data-track), self-servowriting is likely to be a less expensive alternative due to the expense of servowriters, as well as the fact that servowriting operations on a servowriter generally must be performed in a cleanroom environment. Also, as track-densities get higher it becomes more difficult for an external device such as an actuator push-pin to control the position of the R/W heads accurately enough to produce a servo pattern with sufficiently small written-in runout. The expense of servowriting also rises in proportion to the number of tracks on a drive.

FIGS. 4(a)-(f), described above, show an idealized servowriting process in which the radial placement of the writer is virtually perfect during servowriting. In reality, the writer placement will not be perfect, even if the written-in runout of the reference pattern is completely removed, due to non-synchronous positioning errors. There can be several sources of non-synchronous runout. If the servowriting head suffers non-synchronous runout while writing servo wedges, that runout will be written into those wedges.

Figure 5:
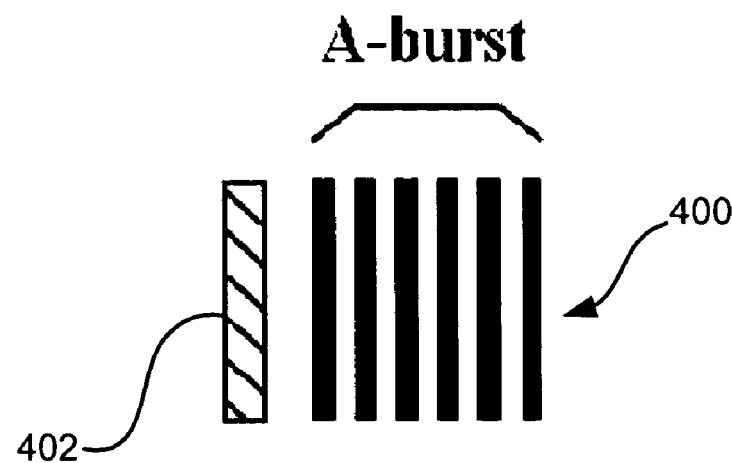
FIGS. 5 and 6 are diagrams of a servo-burst pattern being written over a progression of servowriting steps, wherein there is a head misplacement on the second servowriting step.
Figure 6:
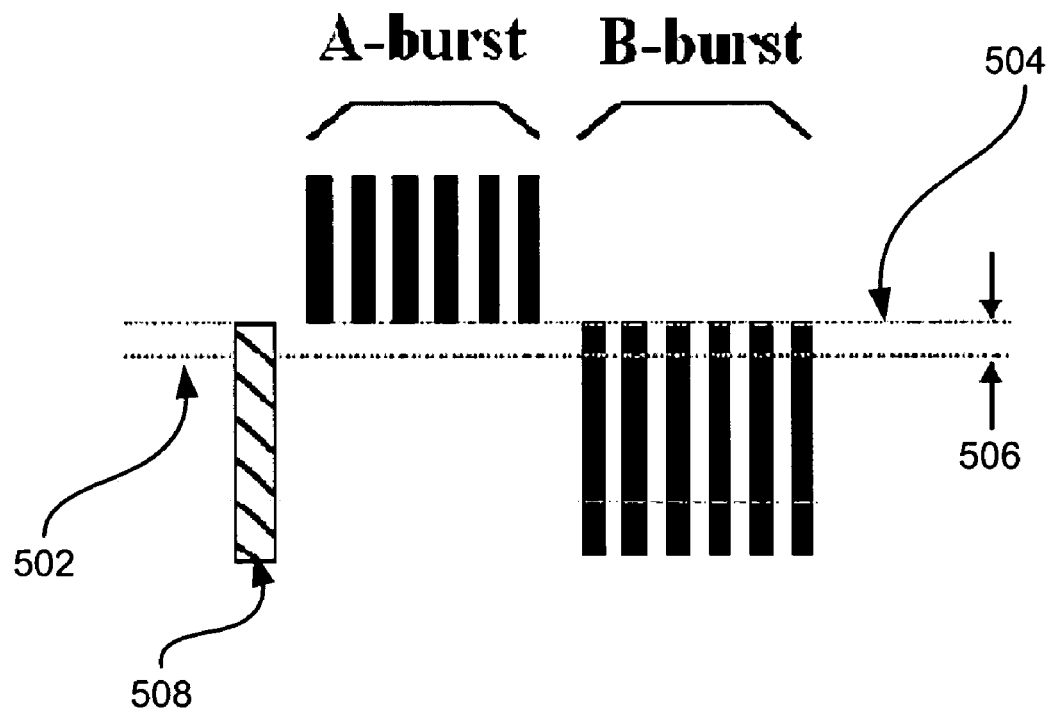

Such a result is illustrated in FIGS. 5 and 6. For the sake of simplicity, only A and B bursts are shown, leaving out the digital information and other bursts. In FIG. 5, the servowriter head 402 in a first servowriting step 400 writes an A-burst. In FIG. 6, the head 508 in a second servowriting step is offset, or mis-placed, a distance from its ideal position. For example, the ideal placement 502 of the top edge of the writer, and therefore the ideal placement of the servo track centerline, is shown a distance from the actual placement 504 of the top edge of the writer 508. This separation is the written-in runout 506.

Repairable Burst Patterns

During a process such as self-servowriting, a drive can sufficiently remove synchronous runout on the reference tracks before each servo-wedge writing pass, in order to allow for the writing of a set of wedges that are as circular as possible. A self-servowriting process can be done by writing tracks in "batches." The size of a batch of tracks can be chosen to be as large as possible, while allowing all of the WORF values used during the process to be stored in drive buffer DRAM. Once the buffer limit has been reached, or sufficiently filled, the drive can begin to servo on the just-written servo pattern, and can spend one or more revolutions at each critical location. If any burst or burst boundary is found to be misplaced by more than an acceptable threshold amount, for example, then that burst or burst boundary can be re-written. An acceptable threshold value can be based upon any appropriate threshold distance, such as a percentage or fraction of a track width, or track pitch, away from the intended or desired location.

During a burst re-writing process, the appropriate WORF values can be used by the servo to avoid spending many revolutions re-measuring the data. Alternatively, those WORF values can be used along with additional position data to better determine the RRO of the reference pattern. More than one burst can also be re-written in a single servowriting step.

Figure 7:
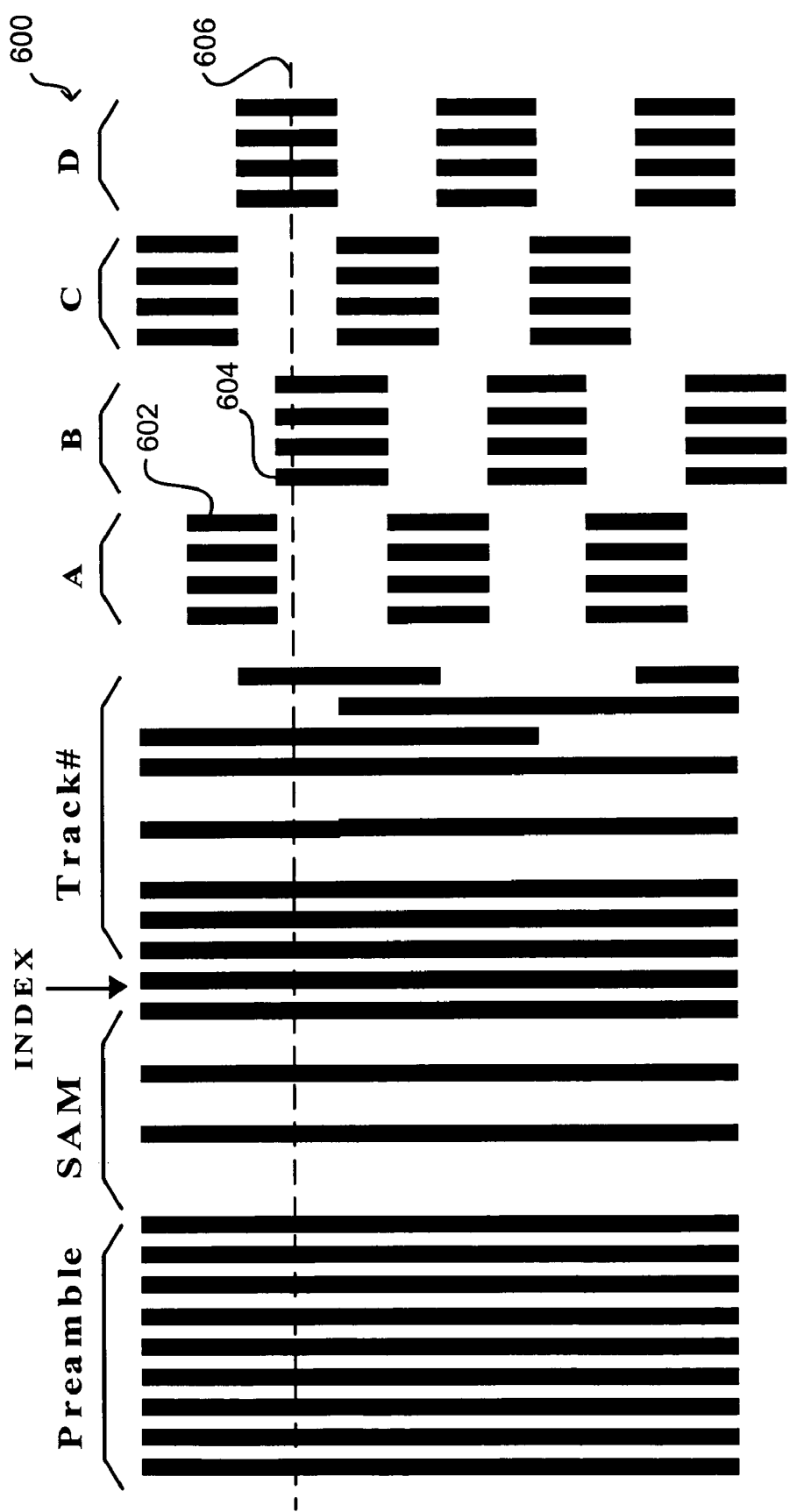
FIG. 7 is a diagram of a burst pattern with one misplaced burst boundary.

Problems can occur when attempting to correct burst placement. For example, a three-pass per track, trimmed servo pattern 600 is shown in FIG. 7. In the pattern, a B-burst 604 has been written with a misplacement that can be determined to be unacceptable, or at least unfavorable. In the Figure, it can also be seen that there is a corresponding misplacement of an edge of the A-burst 602 that was trimmed on the same pass of the head in which B-burst 604 was written. The bottom edge in the Figure of A-burst 602 forms a boundary with the upper edge of B-burst 604, but the boundary is misplaced relative to the desired position of track line 606. If separate passes are used to trim the A-burst and write the B-burst, it is possible that only one or both of the burst edges will be misplaced. If both bursts are misplaced, the edges can be misplaced in the same or opposite directions, and can be misplaced by differing amounts. Servowriting processes suffering from any of these problems can benefit by utilizing systems in accordance with various embodiments of the present invention.

Figure 8:
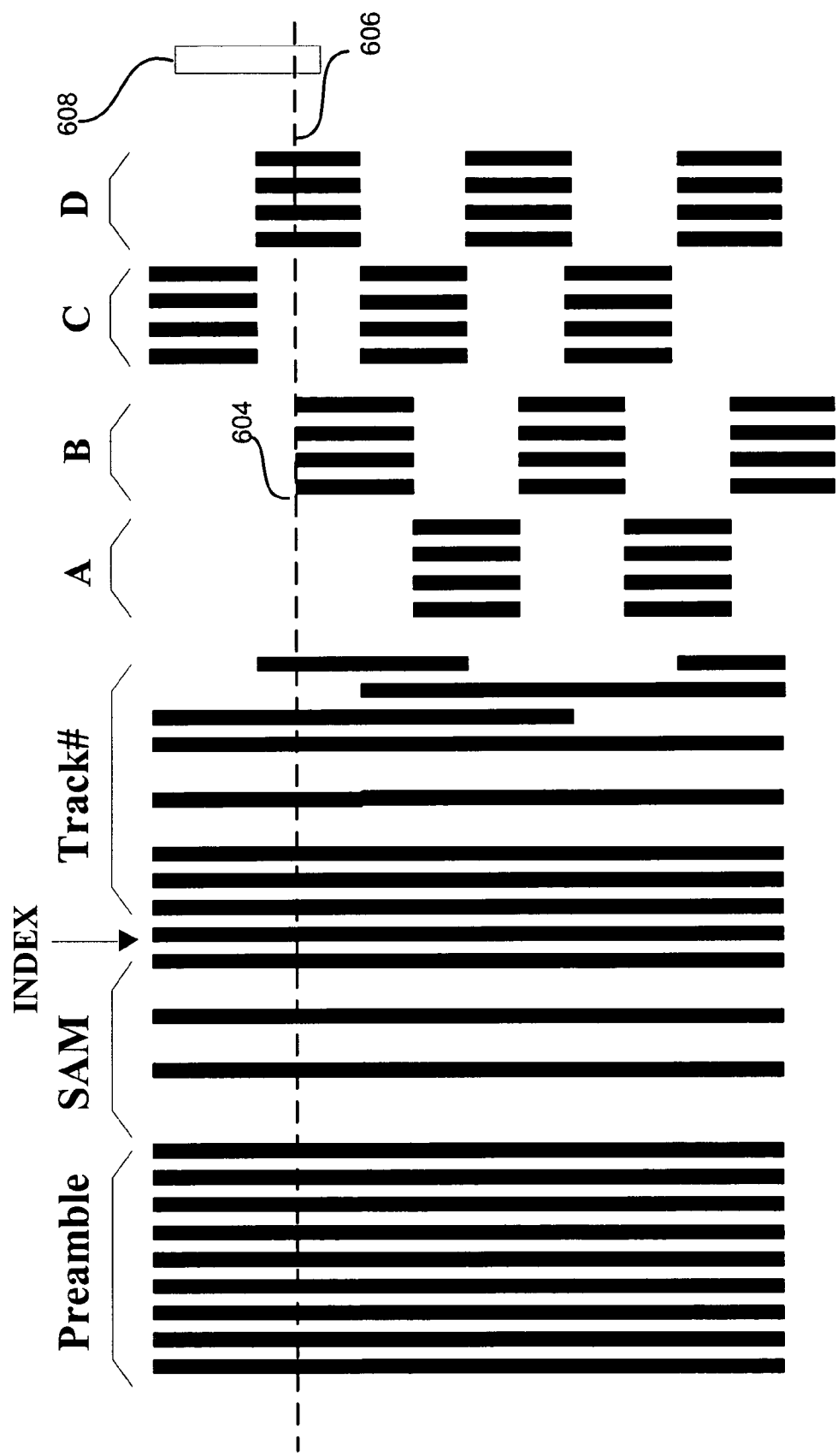
FIG. 8 is a diagram of the burst pattern of FIG. 7 with an erased burst.
Figure 9:
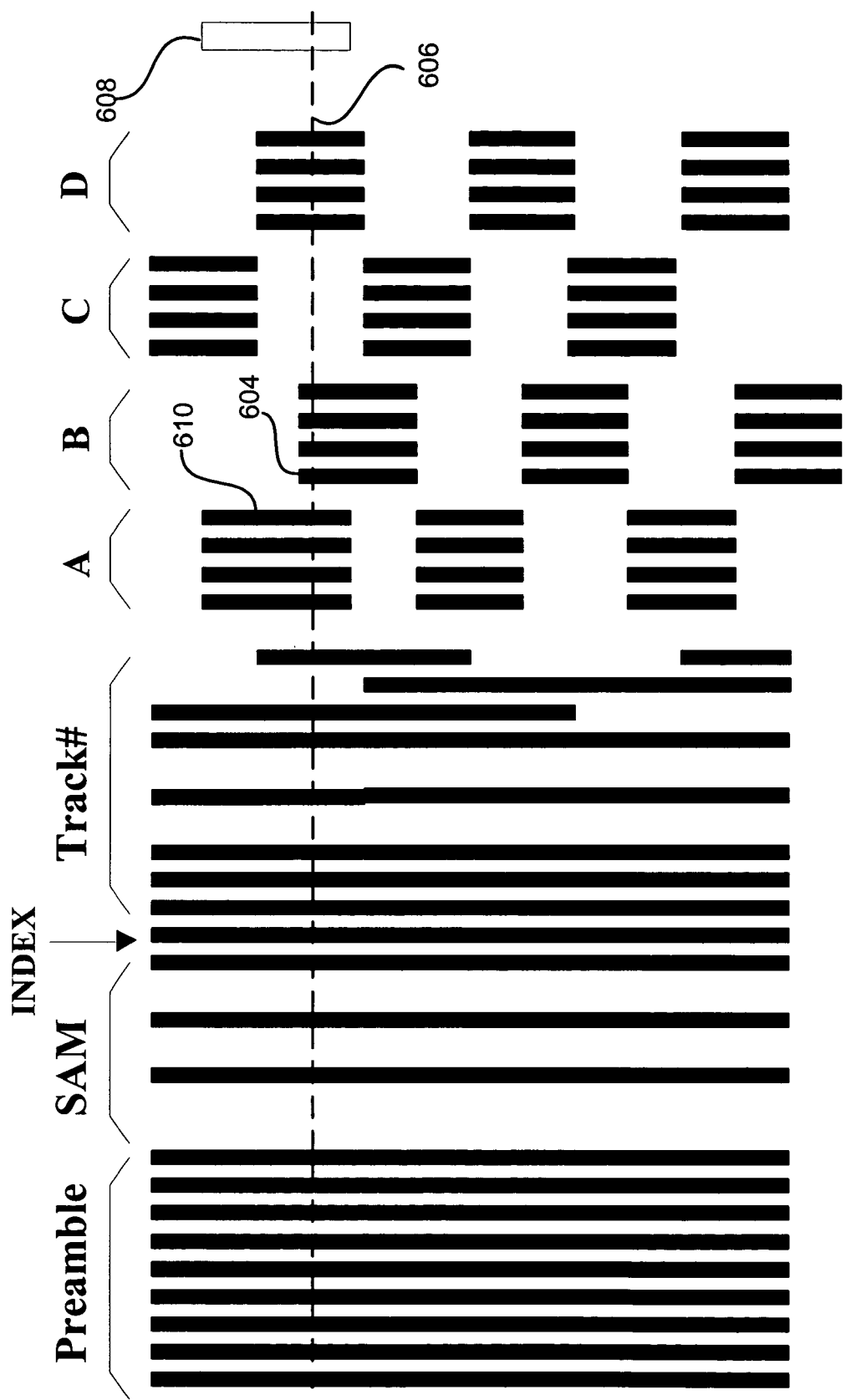
FIG. 9 is a diagram of the burst pattern of FIG. 8 after re-writing the erased burst.
Figure 10:
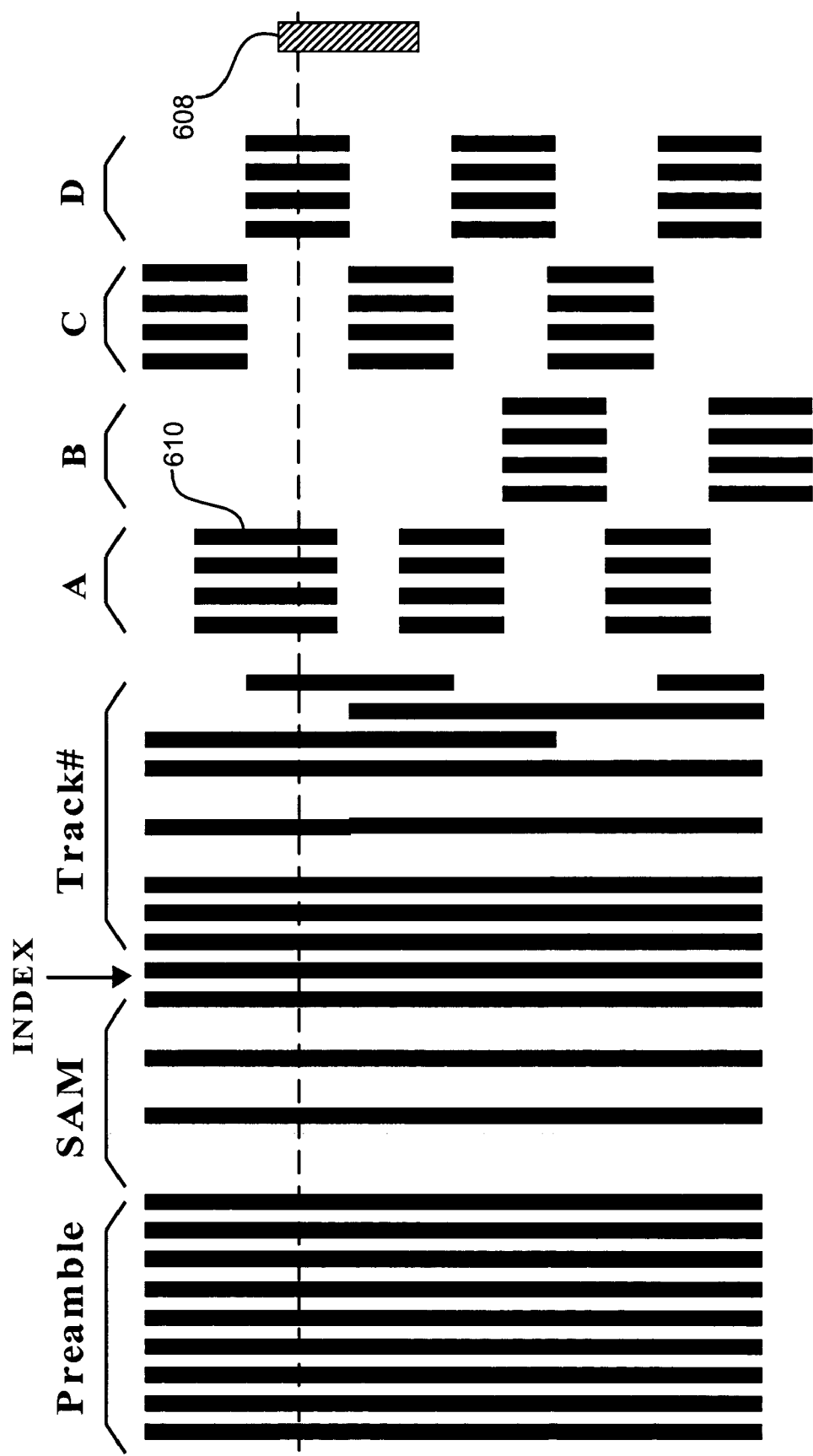
FIG. 10 is a diagram of the burst pattern of FIG. 9 after erasing the other burst making up the misplaced boundary.
Figure 11:
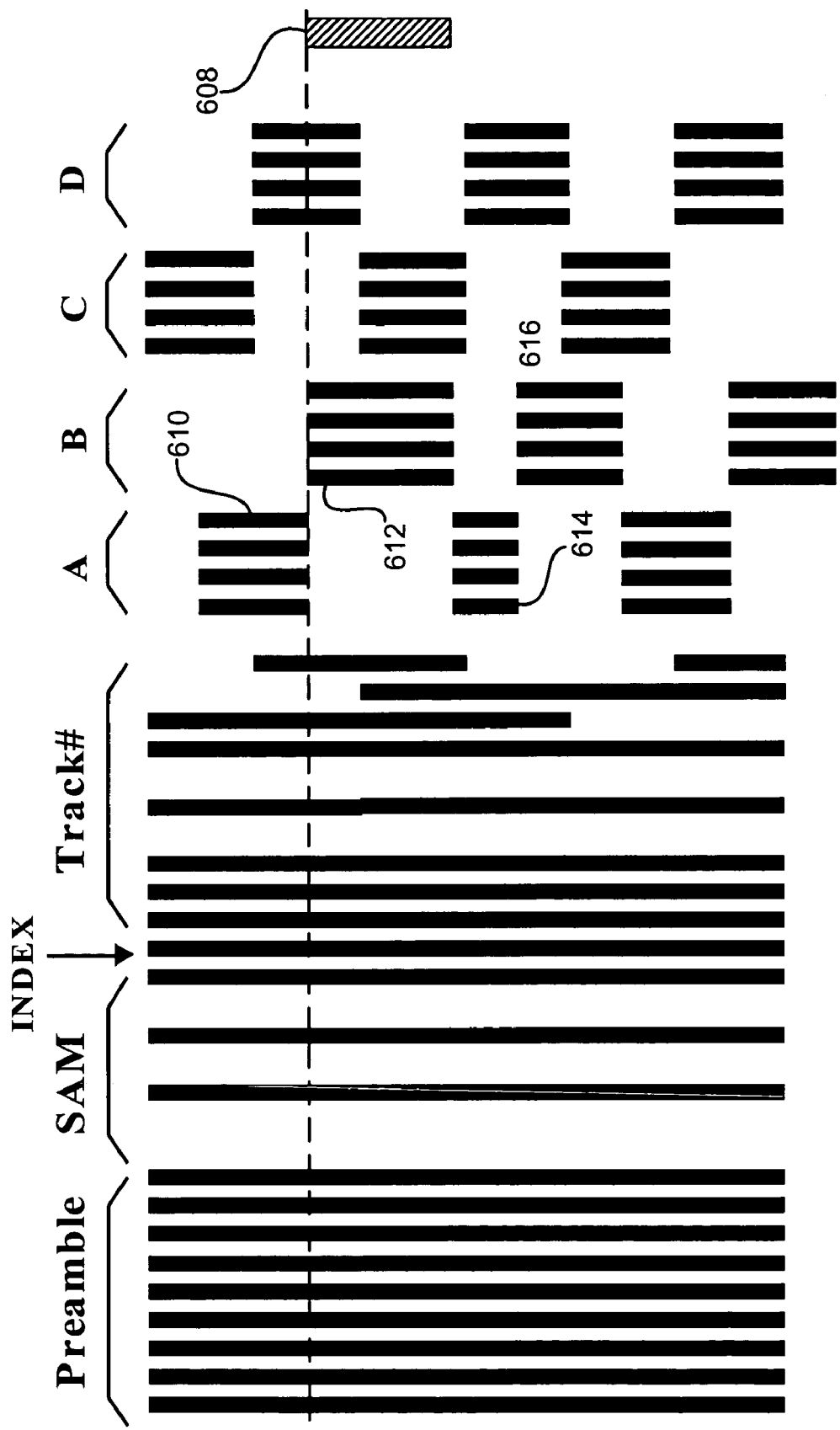
FIG. 11 is a diagram of the burst pattern of FIG. 10 after re-writing the erased burst and trimming the first rewritten burst.

One way to correct the placement of the A-burst 602 and the corresponding B-burst 604 is to erase each burst on a separate pass of a write element over the servo pattern 600. For example, FIG. 8 shows the radial position of a write element 608 for a servowriting step in which the A-burst 602 is erased. FIG. 9 shows a new A-burst 610 written in place of the old A-burst 602 on a subsequent servowriting step of the write element 608. On the next servowriting step of the write element, the B-burst 604 can be erased as shown in FIG. 10. A new B-burst 612 can then be written on a subsequent servowriting step of the write element, as shown in FIG. 11. The A-burst 610 that was recently re-written can also be trimmed during that servowriting step, either in the same pass that wrote the B-burst 612 or in a separate pass. It can be seen, however, that the trimming of the new A-burst 610 has caused A-burst 614 to be partially erased, such that the upper edge of A-burst 614 is no longer in approximately the correct location. Also, if B-burst 612 is trimmed on a subsequent pass, a similar partial erasing will occur to B-burst 616.

If such a process is used to re-write bursts, it can also be necessary to re-write each A-burst and B-burst positioned "below" A-burst 610 and B-burst 612, which can extend to the end of a data zone or until about the inner diameter of the disk. This can require two or more extra servowriting steps per track, one for each rewritten burst (and possibly more if separate passes are used to erase and rewrite each burst), which may be unacceptable in certain circumstances. Alternatively, a track using the boundary of A-burst 614 and B-burst 612 could be sacrificed and designated to not be used on the disk. This can prevent the use of extra servowriting time to re-write all the misplaced bursts, but can significantly reduce the storage capacity of the medium if each track having a misplaced burst has an associated unusable track. In fact, this strategy can result in less drive capacity than if the track containing the originally bad burst (or burst-boundary) is simply abandoned.

Batch Writing

Systems and methods in accordance with one embodiment address the "shingle" problem of having to re-write everything "below" a re-written burst by writing tracks in batches. In writing a batch, a portion of the stroke, such as on the order of ten or twenty tracks, can be written at a time. After a batch of tracks is written, the drive system can examine the tracks in the recently written batch. If any of the tracks in that batch are unacceptable, the drive system can go to the first unacceptable track and rewrite from that track to the end of the batch.

In such an approach, the "shingles" problem can still exist, but will only exist for the tracks "below" the first unacceptable track in the recently written batch. This can be acceptable, depending upon the number of tracks included in the batch. For instance, if the batch size is too large, a small number of misplaced tracks can result in large numbers of otherwise acceptable tracks being re-written, which can adversely impact the time-efficiency of the scheme. If the batch size is too small, the time overhead needed to switch between reference and final wedge sets can become significant. Further, selecting a small batch size can increase the likelihood that newly written tracks are not sufficiently radially aligned with previously written tracks, as the servowriting process has to be interrupted each time some of the just-written final wedges are examined and possibly re-written. The misalignment can result in the radial spacing between the last track of one batch and the first track of the next batch not being be the same as is the radial spacing for tracks within a batch. This problem is likely to be more prevalent for heads other than the reference-head, due to variations in the tilt of the actuator. If, on average, 10% of the tracks need to be rewritten, and there are ten tracks in a batch, on average there is approximately a 65% chance of needing to rewrite at least some tracks in the batch. The expected number of tracks needing to be re-written for a batch can be about four tracks. If the re-writing process is structured to be the same as the original servowriting process, without taking advantage of any of the information obtained during the original process, this can result in an overhead of approximately 40%. In some systems the overhead can be significantly less than 40%, as the WORF values can be reused such that the tracks do not have to be re-examined for WORF purposes.

With an uncorrelated 10% chance of each track being unacceptable, each track can have about a 90% chance of being acceptable. The probability that all 10 tracks are acceptable would then be $0.9^{10}$, or about 0.3487. The probability that at least one track is unacceptable is 1-0.3487, or 0.6513. The expected number of tracks to be re-written is then given by 0.1*10+0.9*(0.1*9+0.9*( . . . +0.9*0.1*1) . . . )), which yields a value of approximately 4.1381. In the formula, the first 0.1 represents the 10% chance that the first track is bad, requiring the rewriting of 10 tracks. The next term represents the 90% chance that the first track is acceptable, multiplied by the 10% chance that the second track is unacceptable, requiring the rewriting of 9 tracks, and so on.

Figure 24:
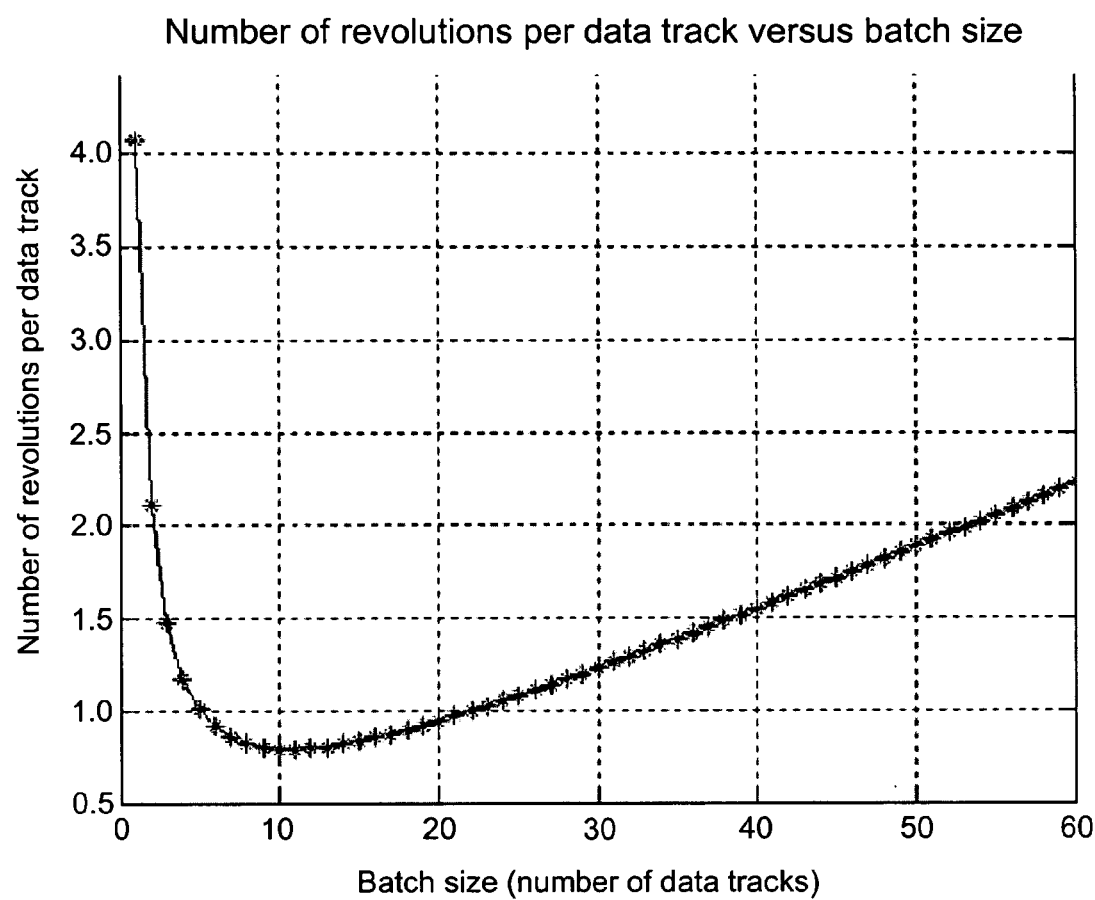
FIG. 24 is a plot of the additional revolutions per servowrite step against the batch size used for servowriting.

FIG. 24 shows an exemplary plot to determine the optimal number of tracks to be included in a batch based on the calculation above. In FIG. 24, the added number of revolutions per servowrite step is plotted as a function of batch size. It can be seen that the minimum number of added revolutions occurs at around 11 tracks. The curve is plotted for a system that requires only one step to switch from writing to reading, and one step from reading to writing. It can be seen that at least about 3/10 of a revolution extra is necessary per servowrite step.

Although the minimum number of added revolutions per data track is for an 11 track band, a choice to use a larger batch size such as 50 might be made, which would add about two revolutions per data track, resulting in a 10% increase to the approximately 22 revolutions per data track that a typical self-servowrite process might utilize. The situation under which a larger batch size is preferred over the minimum (optimal) one may arise when a multi-head drive is utilized to operate on a disk stack. Under the one-head-single-disk scenario, it is possible for the head to take on one or more other tasks after finishing the current batch of servowriting, complete those tasks and start a new batch of servowriting by re-positioning the head to the precise location left off by the previous batch without causing any discontinuities in the servo patterns. Under the multi-head-disk-stack scenario wherein a reference head is used to position all the other heads, however, discontinuities in the servo patterns might occur. This is due to the fact that although the reference head may still be precisely positioned, other heads might be offset from where they intended to be and no longer aligned with the reference head due to factors such as tilting and thermal effects during the back-and-forth movements of the actuators. Since correcting such mis-alignments among multiple heads may take non-trivial effort, it is therefore desirable to choose a large batch size sometimes in order to reduce the occurrence of discontinuities in the servo patterns.

Figure 26:
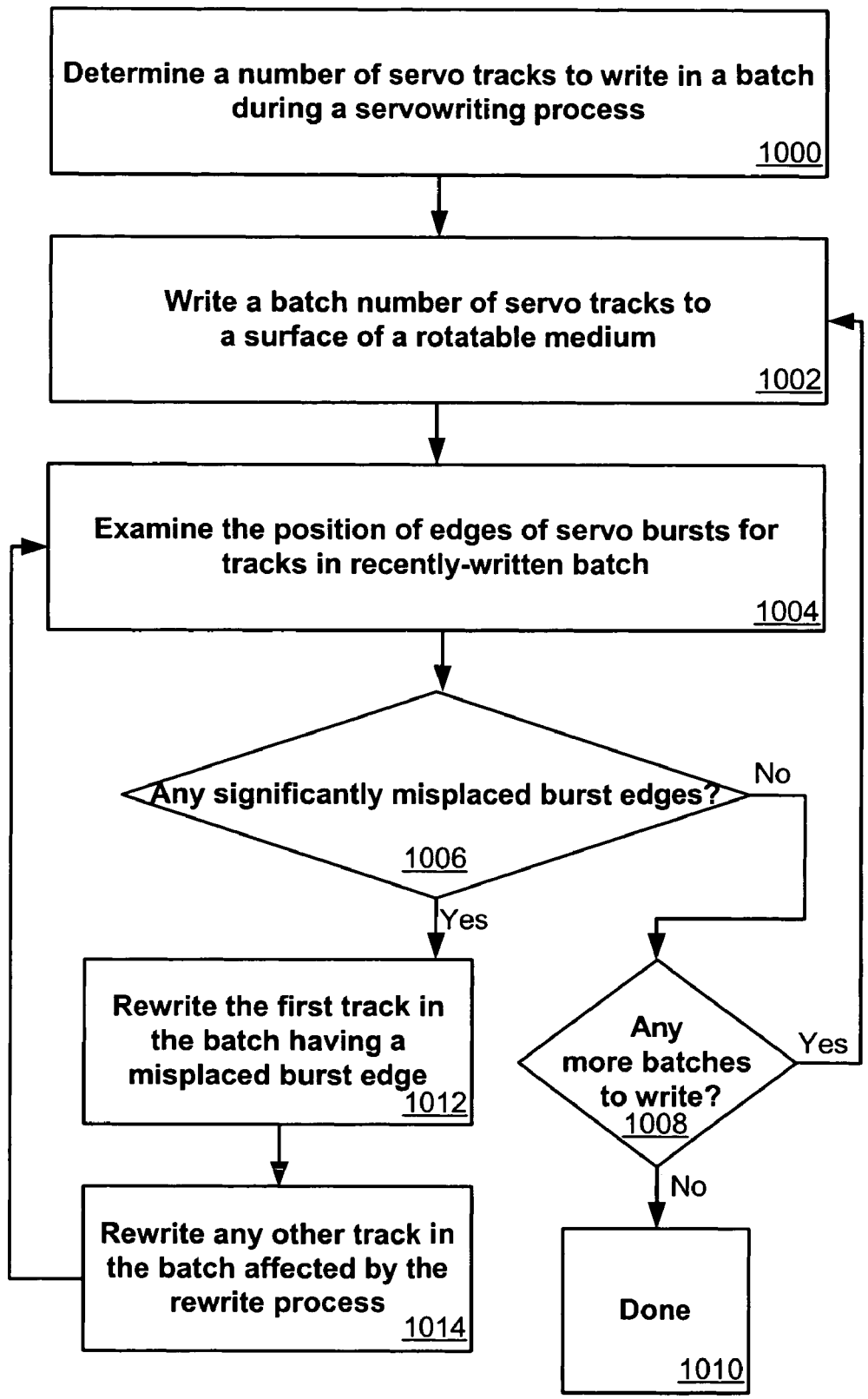
FIG. 26 is a flowchart showing another method that can be used with the system of FIG. 1.

FIG. 26 shows a process that can be used for batch writing in accordance with one embodiment. In such a process, a determination can be made regarding the number of servo tracks to be written in a batch at step 1000. A read/write head can then write a batch of servo tracks to the surface of a rotatable medium, such as a magnetic hard disk at step 1002. After the batch is written, the read/write head can be switched to read mode and the position of each relevant edge of a servo burst in the batch can be examined at step 1004. The system can determine whether any burst edges are misplaced to such a degree that any bursts should be rewritten, as well as any bursts in the batch affected by the rewriting at step 1006.

Once a determination is made whether bursts need to be re-written, the read/write head can move to the first track (in order of writing) having a burst to be re-written. Servo bursts on the first servo track can then be re-written at step 1012. All the servo bursts on the track can be re-written, some of the bursts can be re-written, or only misplaced bursts can be re-written, depending upon the implementation. In some embodiments, it may be desirable to only re-write the misplaced bursts. Each servo track in the batch that was affected by the re-writing can then be re-written at step 1014, moving in the direction of the original writing process so as to minimize the number of tracks to be re-written. For example, if writing occurs in a direction from ID to OD, then re-writing can be done in the same direction such that no tracks outside the batch will need to be re-written.

Once the affected tracks in a batch are re-written, the system can determine whether there are any more batches to be written at step 1008, and if so can move on to the next batch. If no batches remain to be written, the writing process can be complete at step 1010. Alternatively, the system can make another evaluation of the position of the servo information in the batch containing recently re-written servo information. If the re-writing of the tracks produce burst edges that are misplaced, tracks in the batch can again be re-written. The re-writing of tracks in a batch can continue until all the bursts are located within an acceptable distance of their desired locations, or can occur for a maximum number of retry attempts. If a maximum number of retries is met for a batch, the system can simply decide to account for the misplacement of the burst(s), ignore the portion of the track corresponding to the wedge(s) with the misplaced burst(s), or can ignore the track(s) containing the misplaced burst(s).

Additional Servo Bursts

Figure 12:
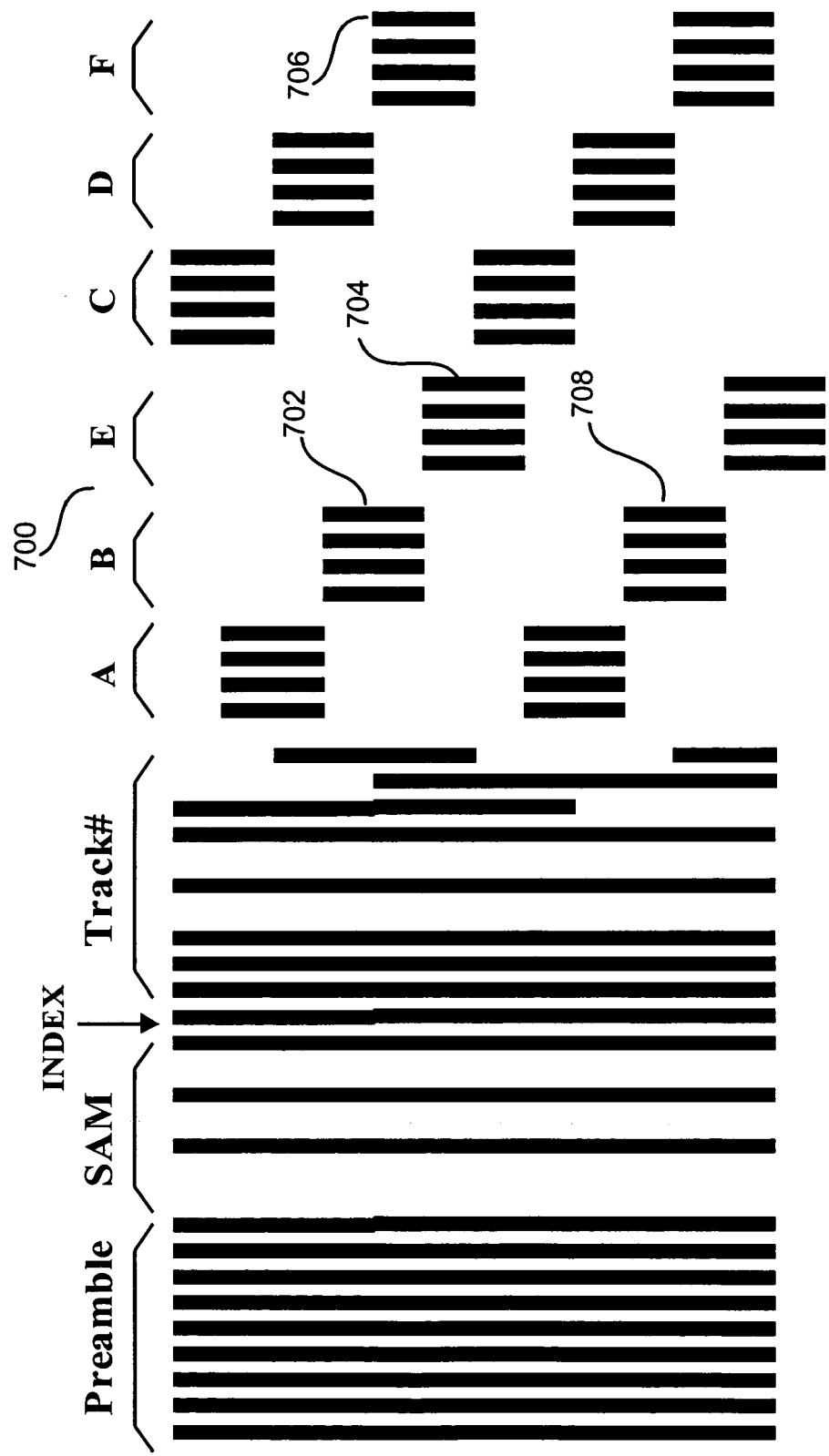
FIG. 12 is a diagram of another burst pattern that can be used in accordance with embodiments of the present invention.

Another approach to repairing a misplaced servo burst, or pair of servo bursts, utilizes a pattern containing extra servo bursts to provide enough radial spacing or separation between bursts to allow the re-writing of a burst without the damaging of an adjacent burst (i.e., bursts aligned radially on adjacent tracks). In FIG. 12, for example, the servo pattern 700 contains two additional bursts, an E-burst 704 and an F-burst 706. The use of these additional bursts provides about two full servo tracks of radial separation between adjacent bursts, such as between B-burst 702 and B-burst 708. As the width of a write element in certain systems is nominally less than 1.5 servo tracks in width, this allows for some misplacement of the write element when erasing and/or re-writing a burst. If only one extra burst were to be added to the pattern, any misplacement of the write element when erasing or re-writing could add that misplacement to an adjacent burst.

Figure 13:
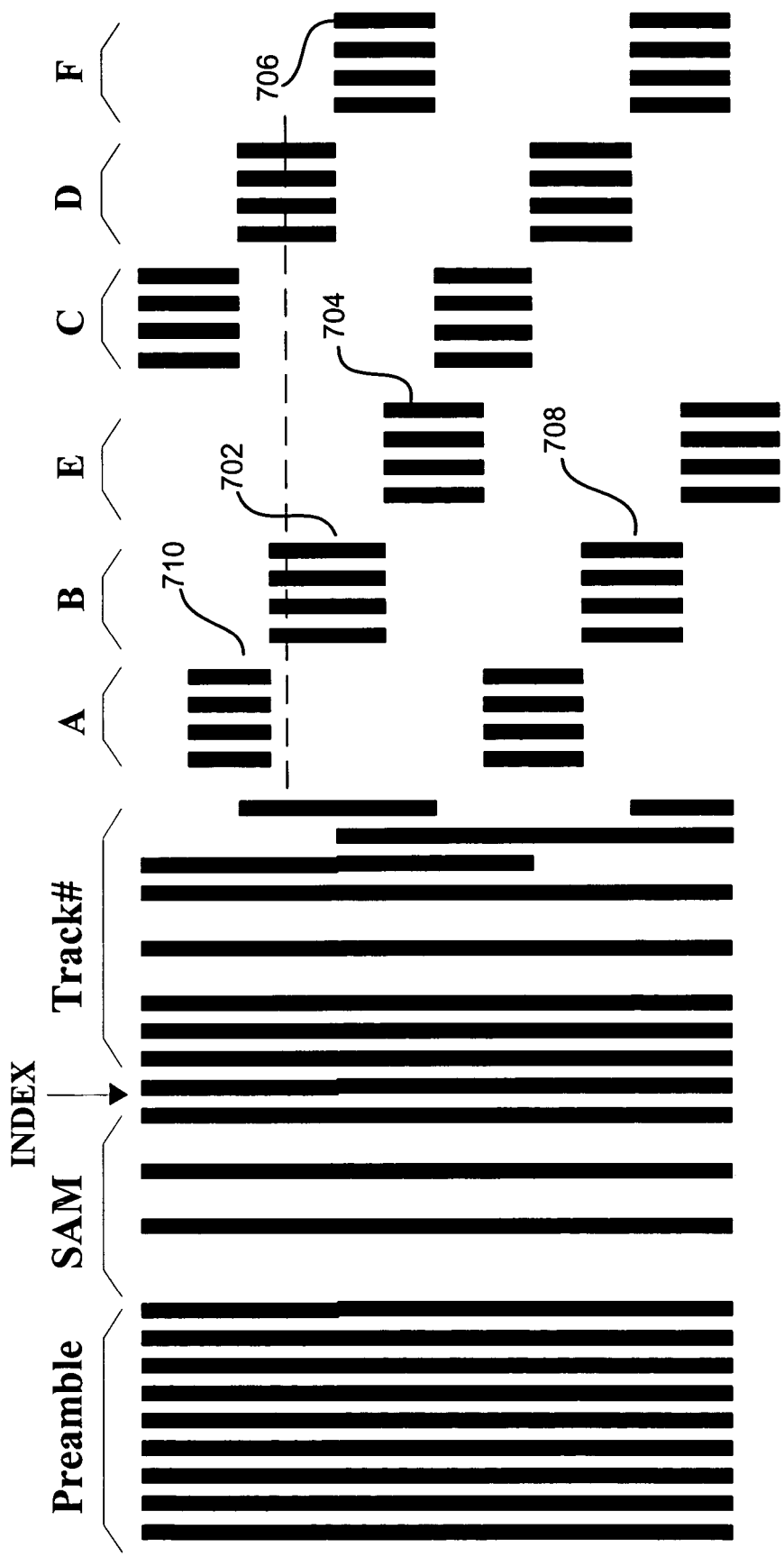
FIG. 13 is a diagram of the burst pattern of FIG. 12 having one misplaced burst boundary.
Figure 14:
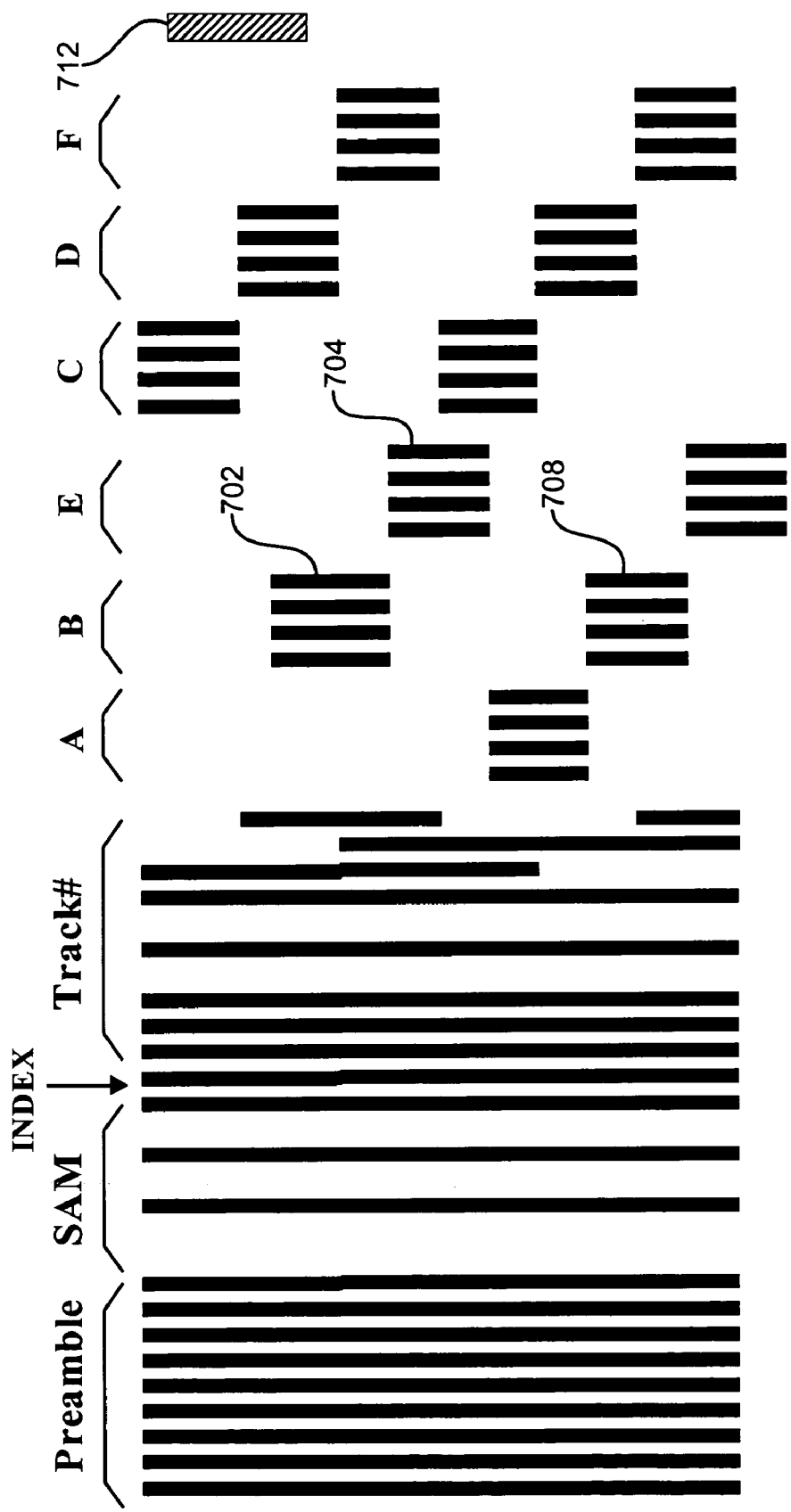
FIG. 14 is a diagram of the burst pattern of FIG. 13 with having one of the bursts associated with the misplaced burst boundary erased.
Figure 15:
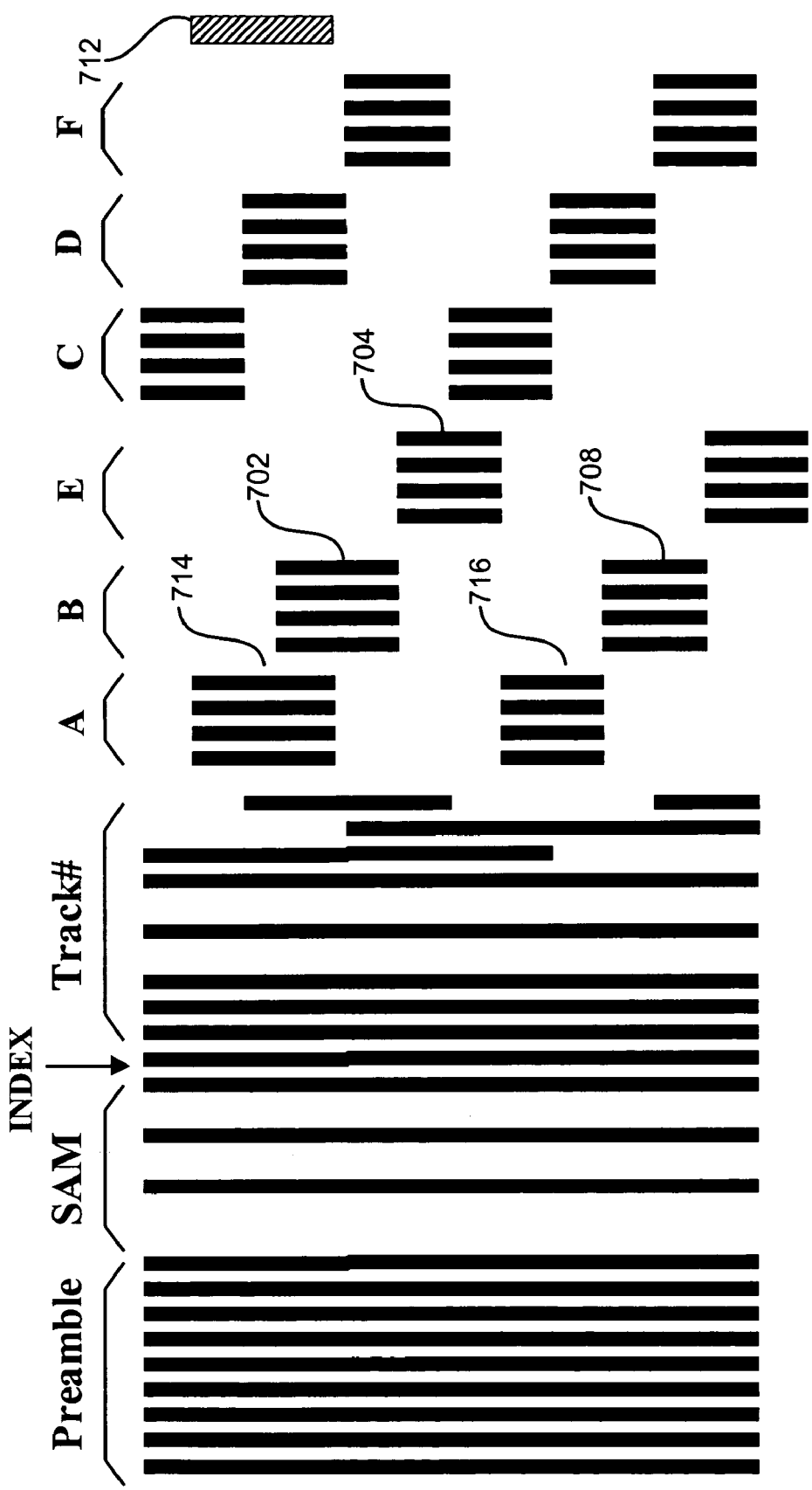
FIG. 15 is a diagram of the burst pattern of FIG. 14 after re-writing the erased burst.
Figure 16:
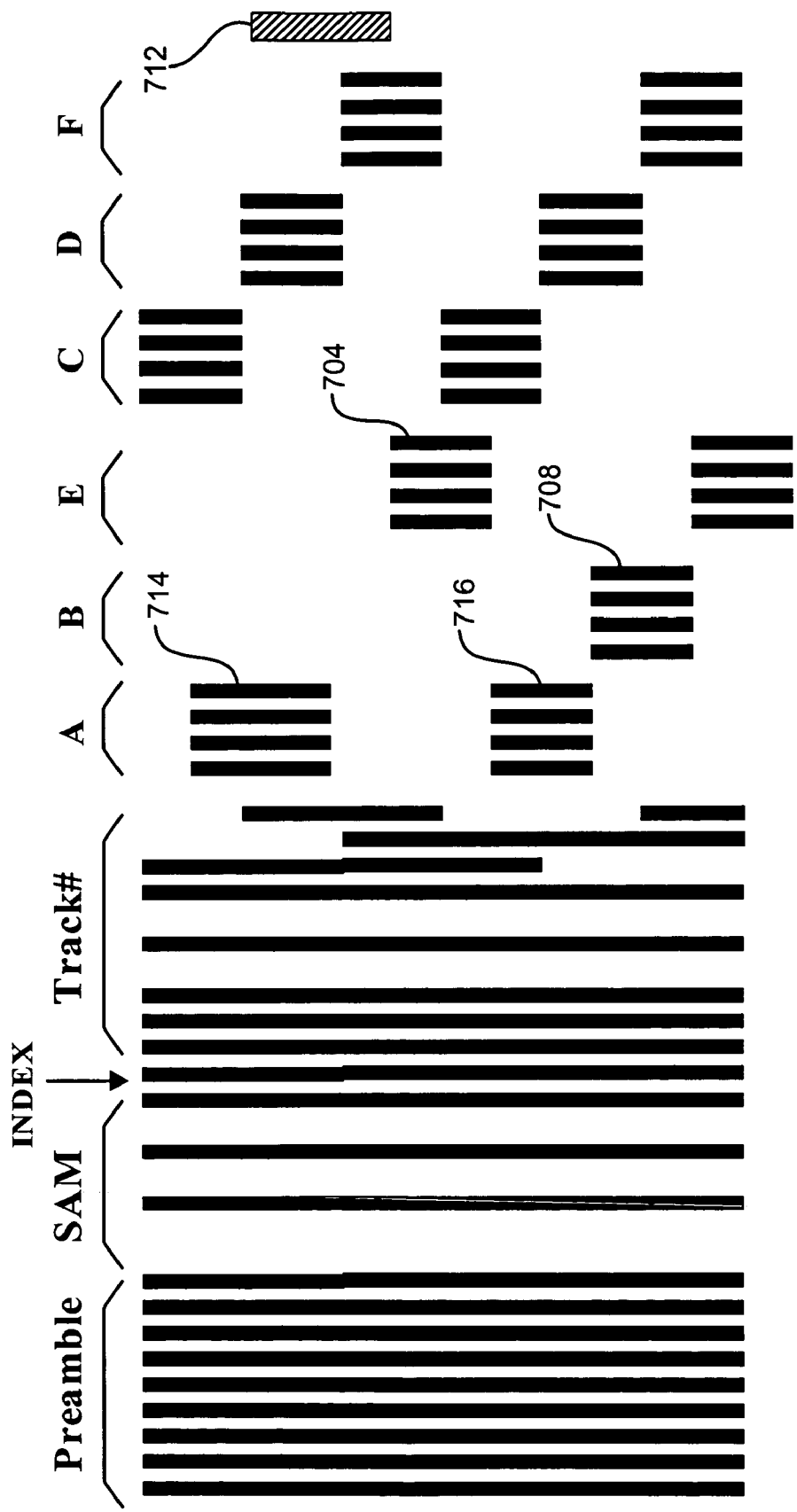
FIG. 16 is a diagram of the burst pattern of FIG. 15 with the other burst associated with the misplaced burst boundary erased.
Figure 17:
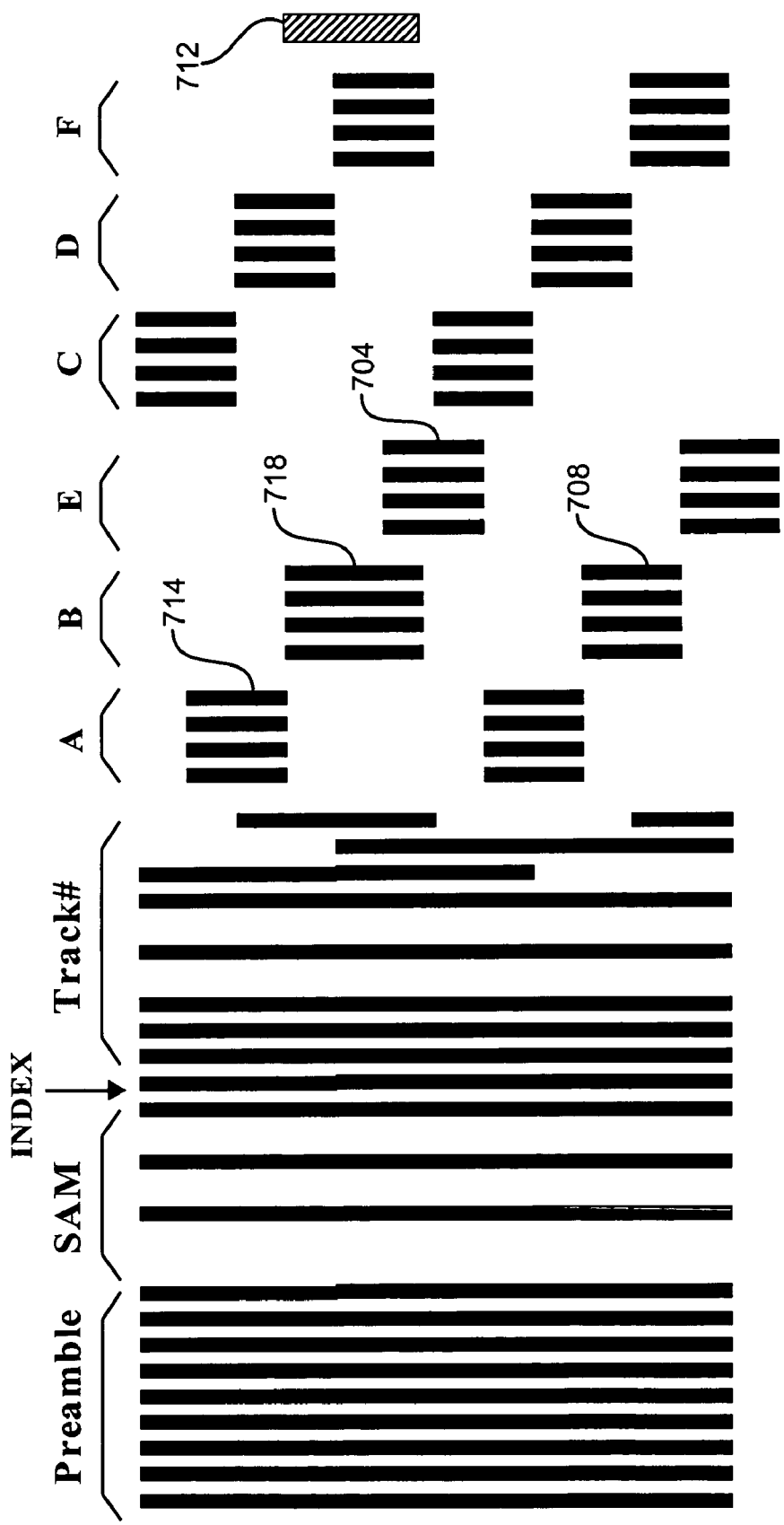
FIG. 17 is a diagram of the burst pattern of FIG. 16 after re-writing the erased burst and trimming the first rewritten burst.
Figure 18:
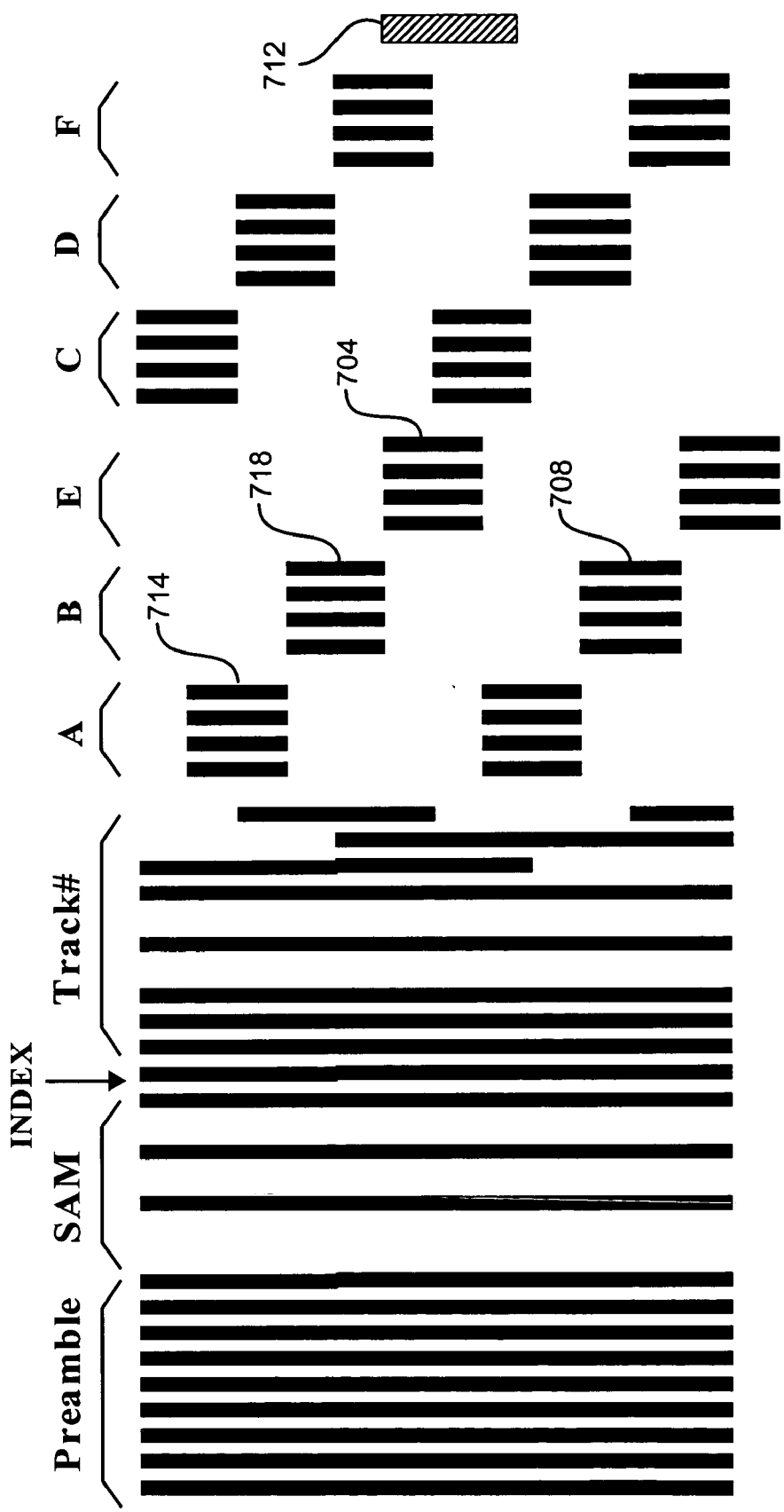
FIG. 18 is a diagram of the burst pattern of FIG. 17 after trimming the remaining untrimmed burst boundary.

For example, FIG. 13 shows the pattern of FIG. 12 with the upper edge of B-burst 702 and the lower edge of A-burst 710 misplaced, due to the head being misplaced on the servowriting step in which A-burst 710 was trimmed and B-burst 702 was written as shown by the dashed-line. FIG. 14 shows a subsequent pass of write element 712 in which A-burst 710 is erased. FIG. 15 shows a re-written A-burst 714. It can be seen that when write element 712 is in position to trim burst 714, there will be sufficient radial distance between write element 712 and A-burst 716 such that A-burst 716 should not have to be re-written. FIGS. 16, 17, and 18 show the erasing of B-burst 702, the writing of new B-burst 718, and the trimming of B-burst 718, respectively, on subsequent passes of the write element 712. This approach also avoids re-writing B-burst 708. This approach can be desirable, as it will not be necessary to erase and re-write multiple A-bursts and B-bursts. It also will not be necessary to sacrifice a track of data. This advantage can come at a price, however, as it may be necessary to extend the servo pattern in the circumferential dimension to add the additional bursts. This can somewhat lessen the storage capacity of the medium. A balance can be made between the benefits of an increase in drive yield and reduction in re-servowriting time overhead, and the corresponding expense of a slightly higher servo format overhead.

Figure 19:
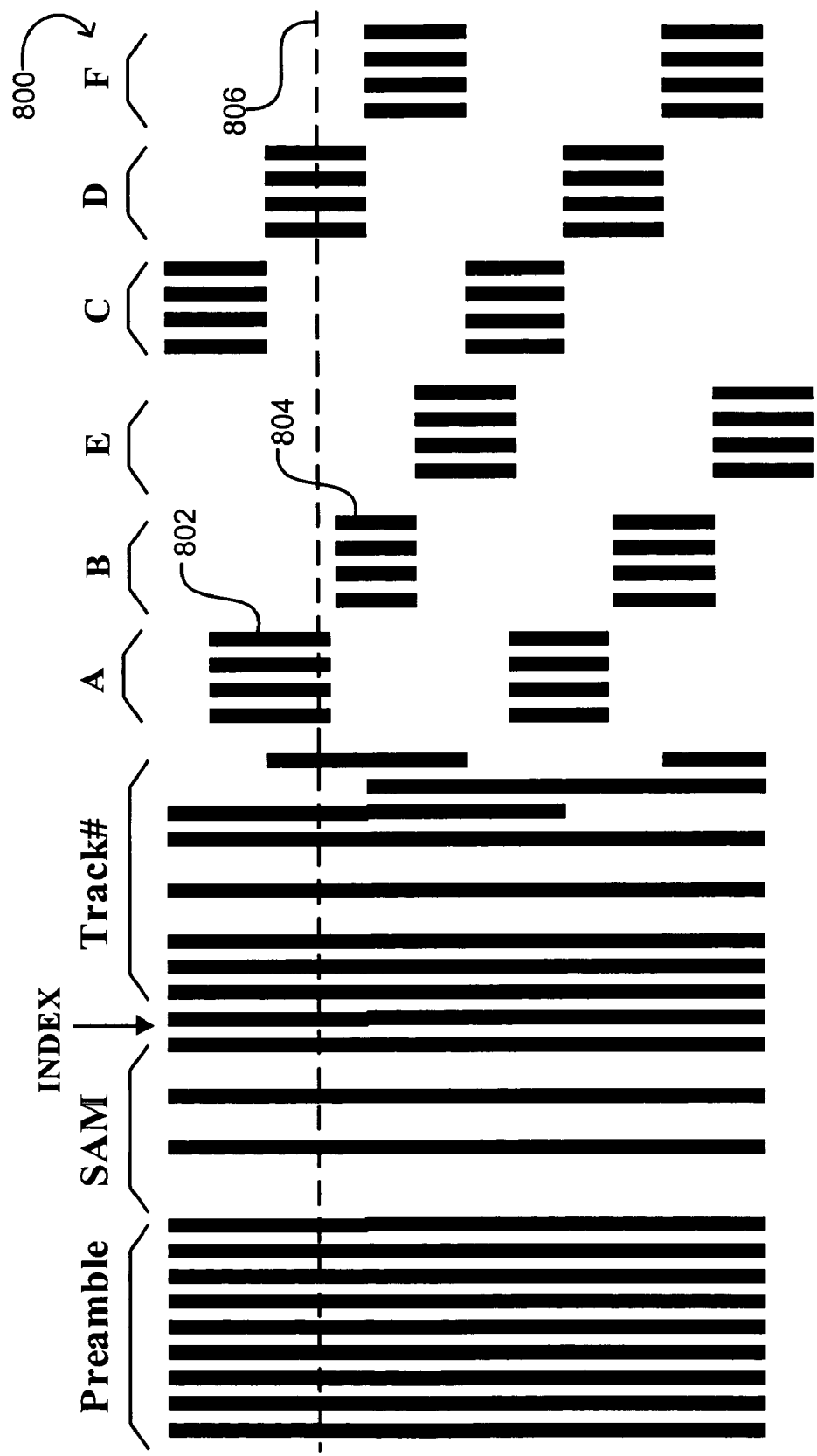
FIG. 19 is a diagram of the burst pattern of FIG. 12 having a different misplacement of a burst boundary.
Figure 20:
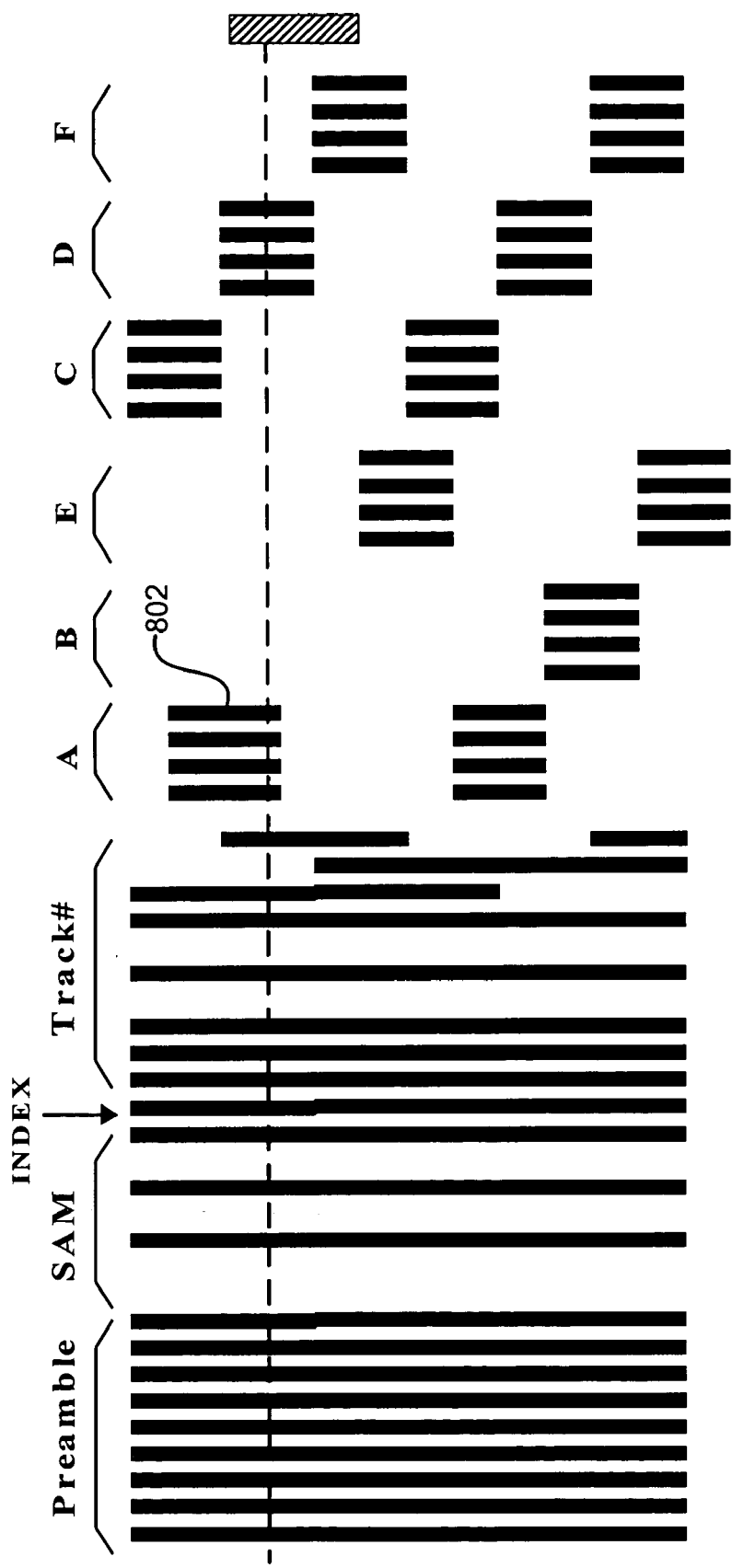
FIG. 20 is a diagram of the burst pattern of FIG. 19 with having one of the bursts associated with the misplaced burst boundary erased.
Figure 21:
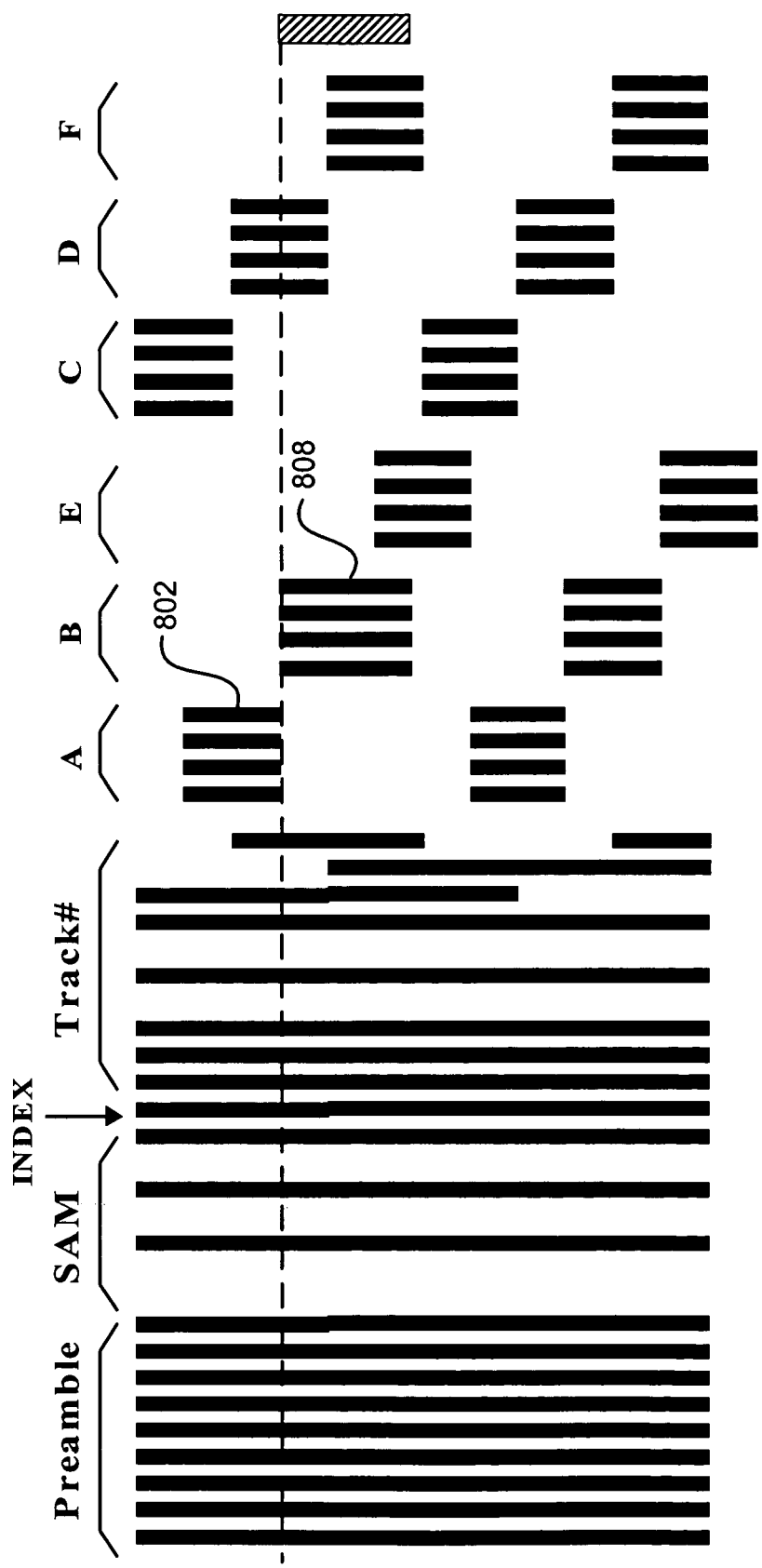
FIG. 21 is a diagram of the burst pattern of FIG. 20 after re-writing the erased burst and trimming another burst associated with the misplaced burst boundary.
Figure 22:
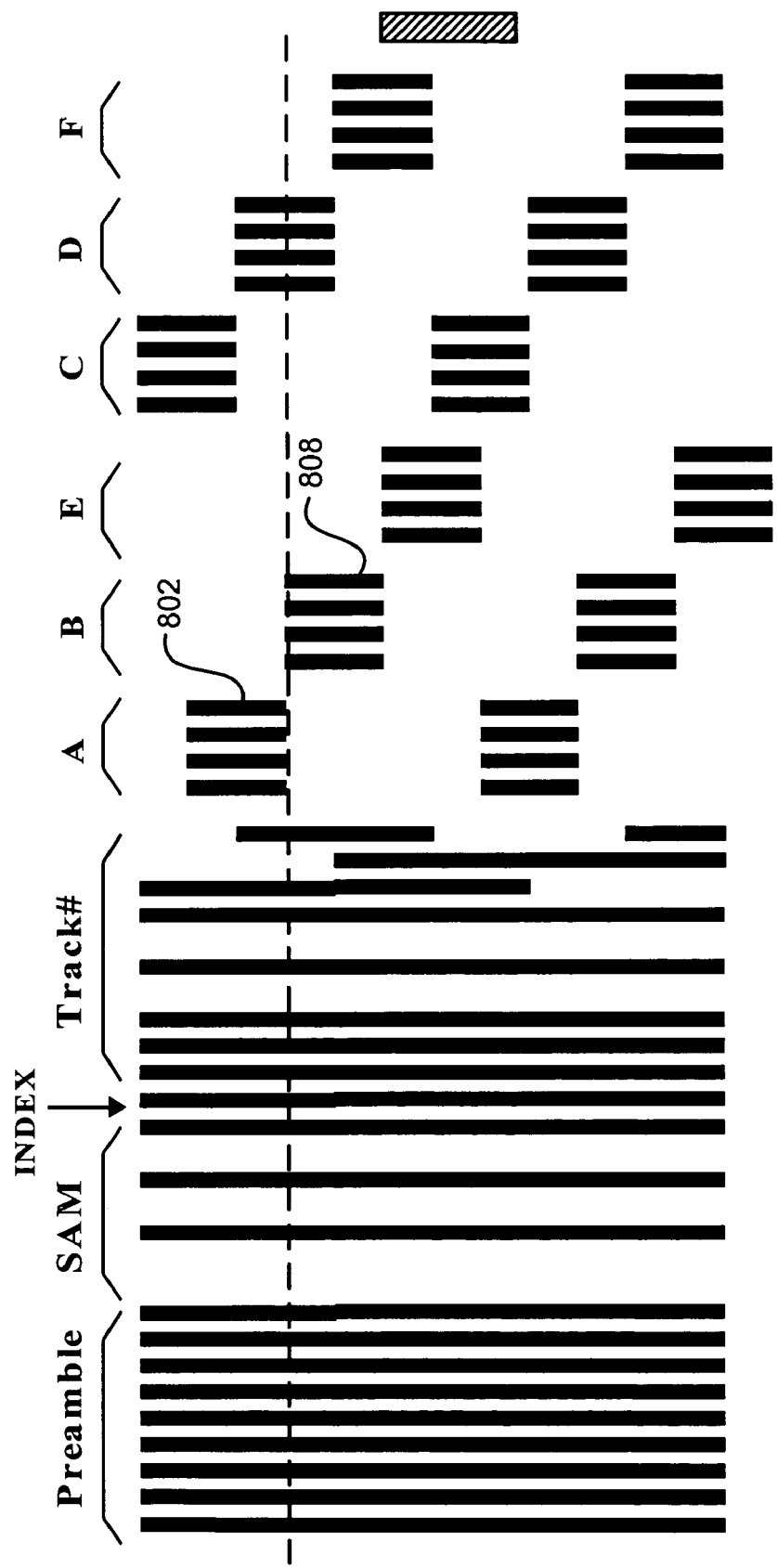
FIG. 22 is a diagram of the burst pattern of FIG. 21 after trimming the other burst boundary associated with the misplaced burst boundary.

FIG. 19 shows a similar pattern to that of FIG. 13, except that in this case a boundary, namely the boundary defined by A-burst 802 and B-burst 804, is "below" intended track line 806. Assuming a downward direction of misplacement and propagation, it is not necessary to erase and re-write A-burst 802, as the A-burst can simply be "re-trimmed" on a subsequent pass, and it may be optional and not necessary to erase B-burst 804 before re-writing it given that the read/write head is capable of fully covering 804 during the re-writing. The erasing of 804 is still necessary, however, under a upward direction of misplacement with downward propagation. FIG. 20 shows B-burst 804 being erased on a subsequent pass. FIG. 21 then shows A-burst 802 being trimmed and new B-burst 808 being written on a subsequent pass (or on two separate passes as discussed later). Finally, FIG. 22 shows new B-burst 808 being trimmed.

Figure 25:
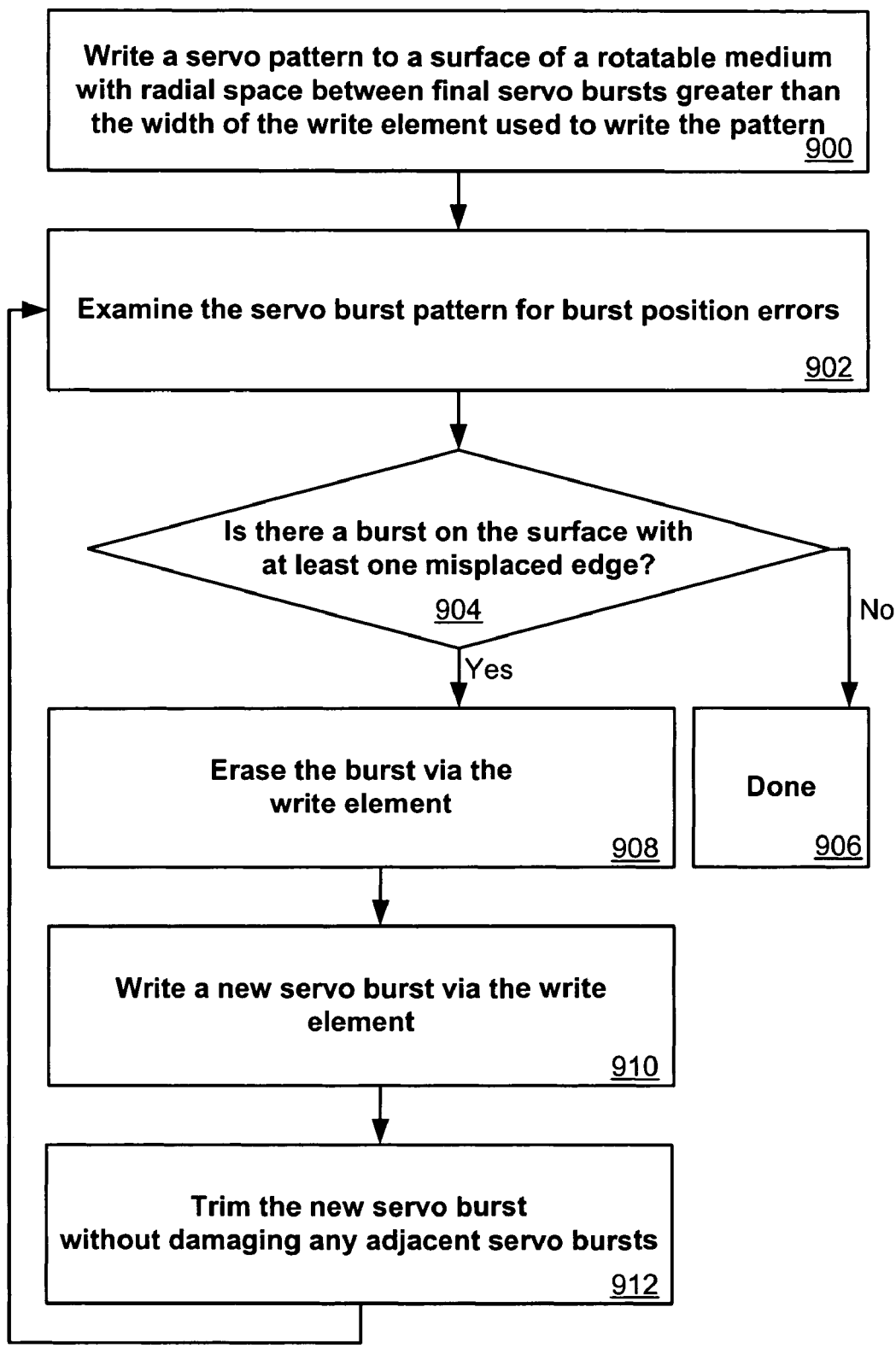
FIG. 25 is a flowchart showing a method that can be used with the system of FIG. 1.

One process that can be used with such a pattern is shown in FIG. 25. In such a process, a servo burst pattern with sufficient radial spacing between bursts can be written to a surface of a rotatable medium at step 900. The written pattern can be examined for burst positioning errors at step 902. Burst patterns can be examined on a track-by-track basis while writing, on a batch-by-batch basis after writing a specified number of tracks, or after the entire pattern has been written. Due to the time necessary to switch between write and read operations, it may be desirable to wait until the entire pattern has been written before examining the pattern in order to reduce the required amount of expensive servowrite time.

A determination can be made whether a servo burst in the pattern has a relevant edge that is misplaced beyond an acceptable variation amount at step 904. If no burst edges are unacceptably misplaced, the process can be complete at step 906. If there is a servo burst with an unacceptably misplaced edge, that burst can be erased (optional under downward misplacement direction and necessary under upward misplacement direction) on a first pass of the write element over the servo track containing that burst at step 908. On a subsequent pass of the write element over that servo track, a new servo burst can be written in the position that was intended for the misplaced burst that was recently erased at step 910. On a subsequent pass, with an appropriate radial shift of the write element, the newly written servo burst can be trimmed at step 912. The radial spacing of the pattern allows the servo burst to be trimmed without damaging any adjacent servo bursts.

Separate Trim and Write Systems

Figure 23:
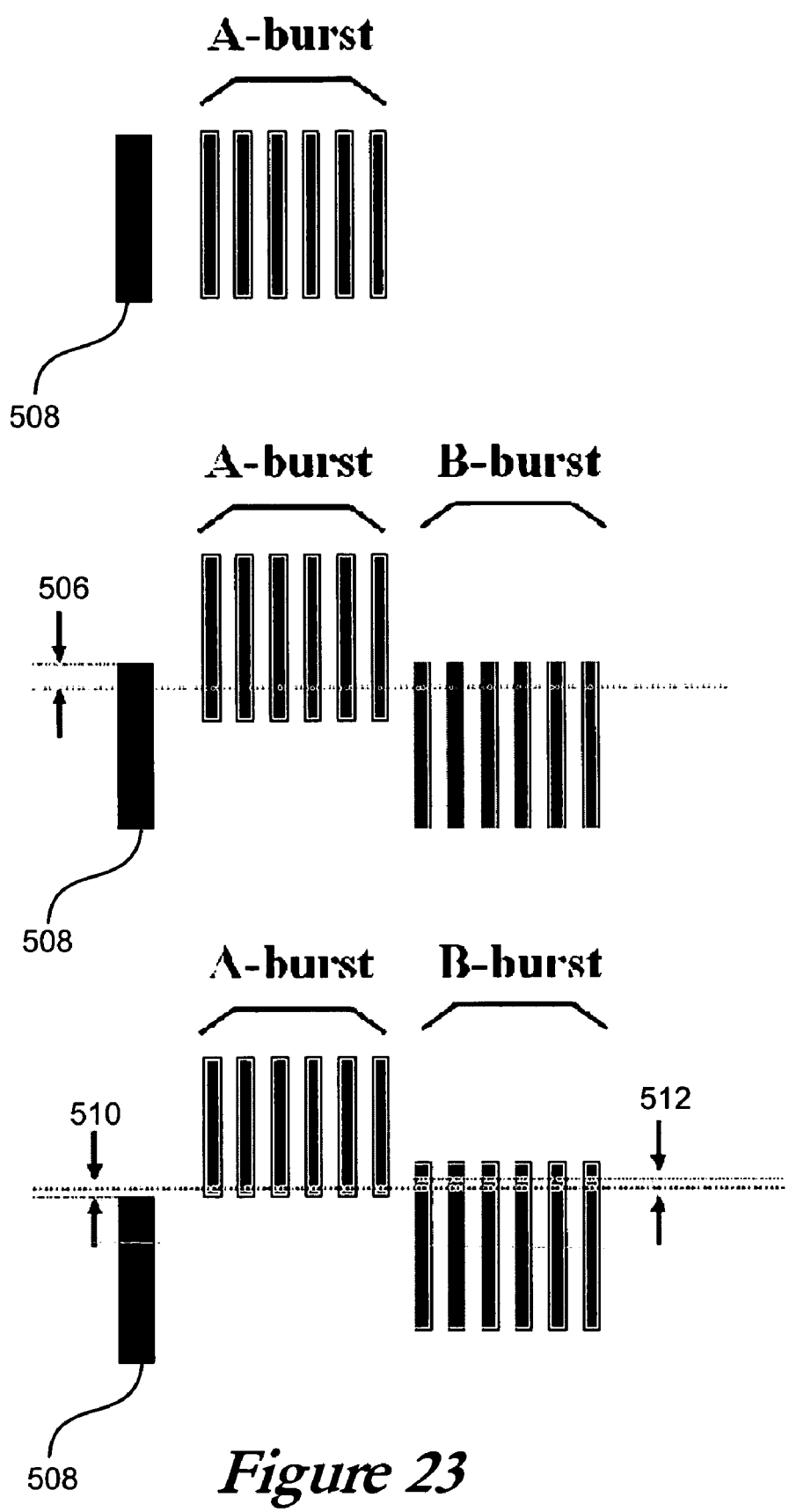
FIG. 23 is a diagram of a servo-burst pattern of FIG. 6 being written over a progression of servowriting steps using multiple passes.

Separate passes can be used to trim and to write in certain servowriting, or self-servowriting, operations. For example, FIG. 23 shows what can occur when an A-burst is trimmed on a separate pass of the write element 508 than the pass in which the B-burst is written. The head 508 writes an A-burst in the first servowriting step. In a first pass of the second servowriting step, the head 508 writes a B-burst and is displaced a first distance 506 when writing the B-burst. Unlike in FIG. 6 though, the A-burst is not trimmed on this pass. In a second pass of the second servowriting step, the head is displaced a different distance 510 from the expected position when trimming the A-burst, leaving a smaller written-in runout 512 than would have occurred had the A-burst been trimmed and the B-burst written in a single pass of the second servowriting step (which would have been approximately equal to the misplacement 506 on that pass) as shown in FIG. 6. The A-burst also could have been trimmed before writing the B-burst.

Using separate passes allows for only one of the two bursts to have a misplaced edge if the write element is misplaced during a pass. For example, if the head is misplaced while writing the B-burst, the A-burst will not need to be re-written as it was trimmed on a pass in which the write element was not unacceptably misplaced. Using a pattern such as that shown in FIG. 13, the misplacement of B-burst 702 would not have necessarily resulted in a misplaced trimming of A-burst 710 if the writing and trimming were done on separate passes. B-burst 702 could simply be (optionally) erased and a new B-burst written, such as B-burst 718 shown in FIG. 17, and trimmed as shown in FIG. 18.

Two independent positions can exist when such a multi-step trim approach is used, as the radial location of the write element can be at least slightly different between the two passes. In many drive systems, however, it may not be possible to accurately determine which boundary edge is misplaced. For example, in FIG. 17 the servo could determine that the boundary comprising B-burst 718 and E-burst 704 is too "low" in the Figure. The system may not, however, be practical to determine that it is the lower edge of B-burst 718 that is misplaced and not the upper edge of E-burst 704. In such case, it may still be desirable to erase and re-write both bursts even though only one of the bursts may be misplaced.

Utilizing WORF Information

In some embodiments, a drive system can utilize WORF technology to place position correction values after servo information for each individual wedge in order to reduce the effects of written-in runout of either the final pattern or the reference pattern. WORF and/or PES information for a track might indicate, for example, that a particular edge or boundary is unacceptably misplaced. At this point, a decision can be made whether any of the wedges for the track should be re-written. A drive system can decide to re-write burst(s) on none of the wedges, some of the wedges, only the bad wedges, or all of the wedges. If WORF technology is being used, the drive system can already be taking the time to figure out correction numbers. The system can therefore set a threshold beyond which bursts on at least a servo wedge (such as a wedge in a final pattern), or a portion of a servo track, should be re-written.

Figure 27:
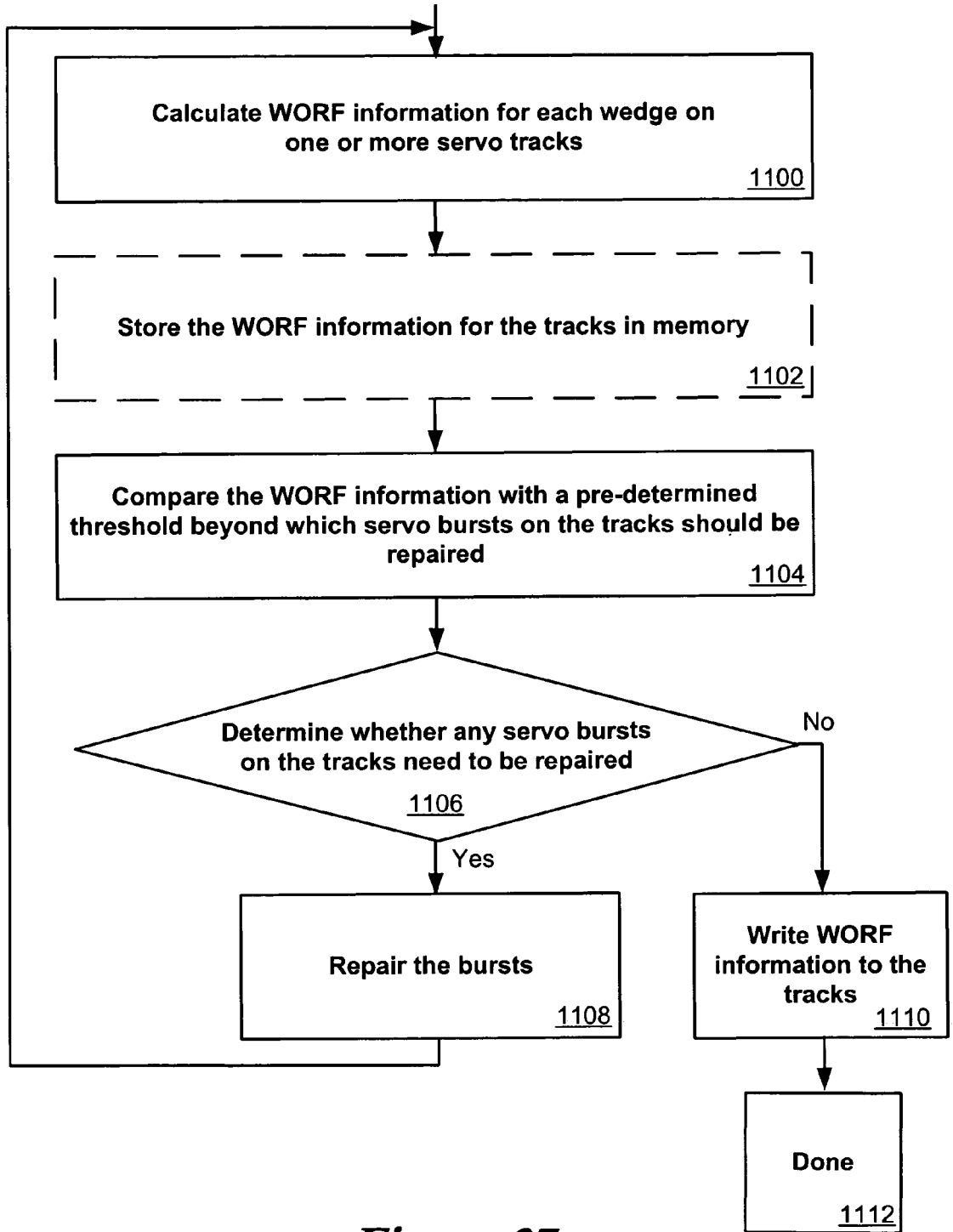
FIG. 27 is a flowchart showing another method that can be used with the system of FIG. 1.

FIG. 27 shows a process that can be used for servowriting in accordance with one embodiment. In such a process, WORF and/or PES information can be observed and calculated for each wedge on one or more servo tracks at step 1100, and then optionally stored in memory on the drive, such as the drive DRAM at step 1102. Such WORF and/or PES information can then be compared at step 1104 with a pre-determined threshold beyond which servo bursts (or burst boundaries) on wedges of the tracks should be re-written. The system can determine whether any bursts on the servo tracks are misplaced to such a degree that they should be rewritten, as well as any bursts affected by the rewriting at step 1106. If it is determined that bursts are to be re-written, the read/write head can move to the first track (in order of writing) to repair a misplaced burst at step 1108. Step 1100 through 1108 can be repeated so that bursts on each servo track affected by the repairing on an adjacent track can be re-written if necessary, wherein the WORF information of the servo track should be re-calculated first following an earlier re-writing and trimming. Finally, the WORF and/or PES information can be stored on those one or more tracks at step 1110 once the repairing is done.

When being used for the purpose of self servowriting, WORF information can typically be stored in the memory of the drive instead of being written on the disk, as in the case of the final products. This may potentially speed up the self servowriting if WORF information on for example, a reference pattern of a track, is kept in memory when first calculated, and later retrieved from memory instead of re-calculated when the reference pattern on the same track is used again during servowriting in order to adjust ("straighten out") the head position to servo on the reference pattern and/or repair the wedges of the final pattern. Optionally, the reference pattern can be examined and new WORF information can be re-calculated over an extra number of revolutions of the track the second time around. This newly calculated WORF information can be combined with the WORF information stored previously to achieve better head adjustment in order to better servo on the reference pattern and/or repair the final pattern.

Figure 28:
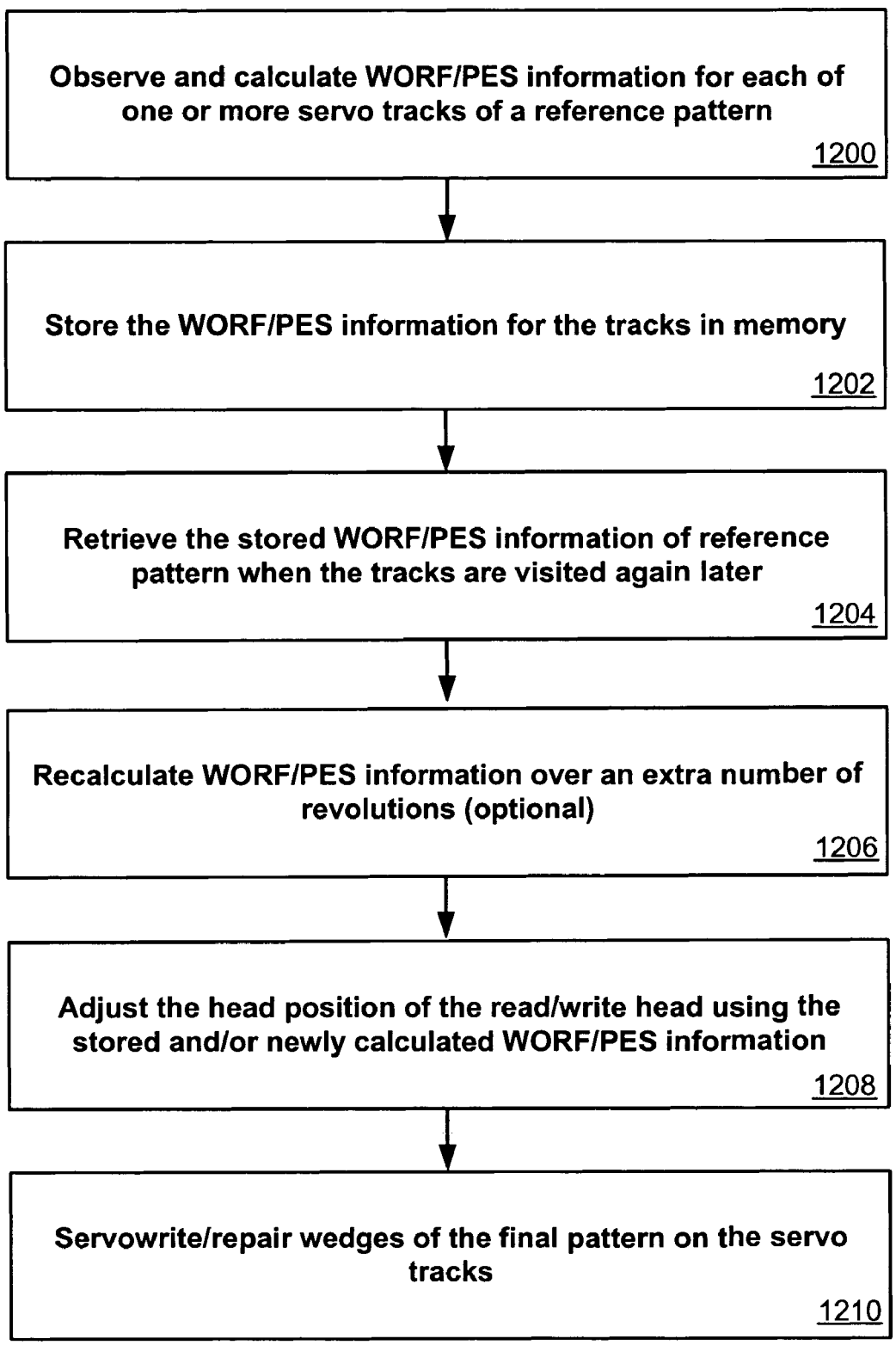
FIG. 28 is a flowchart showing another method that can be used with the system of FIG. 1.

FIG. 28 shows a process that can be used for servowriting in accordance with one embodiment. In such a process, WORF and/or PES information can be observed and calculated for each of one or more servo tracks in a reference pattern at step 1200, and then stored in memory on the drive, such as the drive DRAM at step 1202. When the reference pattern is servoed on again during the same or subsequent servowriting step, the stored WORF information can be retrieved from the memory instead of being re-calculated at step 1204. Optionally, new WORF information can be observed and re-calculated for each of the one or more servo tracks over extra revolutions at step 1206 in addition to the retrieved WORF information. The stored and/or newly obtained WORF/PES information can then be combined and used to adjust the head position of the read/write head at step 1208 in order to servo the reference pattern and repair wedges in the final pattern in at step 1210. For example, once the WORF information of a reference pattern on servo track# 100 is observed and calculated, it can be stored in memory while the servowriting process continues on to track# 300. Later, when track# 100 is visited again during the servowriting process, the stored information can be retrieved instead of recalculated. Since multiple revolutions needed to observe and re-calculate the WORF information can be spared, the servowriting process can be speeded up and become more time-efficient.

If there is a limit to the amount of information that can be stored in memory of the drive, such as in drive DRAM, the amount of WORF information that can be stored and re-used can be limited. Therefore, it may be desirable to write tracks in batches, such as a batch of 1/10 of the tracks on the disk, such that WORF values can be stored for all the tracks until it is determined, for example, that all the tracks in the batch are acceptable. If a drive system has enough memory, there may be no advantage to writing in batches. Compression of the stored data may be used to extend maximum possible batch size. Or, if there is little memory available, the tracks can simply have the WORF values recalculated.

Although embodiments described herein refer generally to systems having a read/write head that can be used to write bursts on rotating medium (magnetic media), similar advantages can be obtained with other such data storage systems or devices. For example, a laser writing information to an optical media can take advantage of additional passes when writing position information. Any media, or at least any rotating media, upon which information is written, placed, or stored, may be able to take advantage of embodiments of the present invention.

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalence.

What is claimed is:

1. A method to support repairable servowriting, comprising:
    calculating a first set of wedge offset reduction field (WORF) and/or position error signal (PES) information for one or more servo tracks on a surface of a rotating medium;
    comparing the first set of WORF and/or PES information for the one or more servo tracks with a pre-detennined threshold;
    repairing a servo burst and/or a boundary of the servo burst on the one or more servo tracks via a read and/or write element of a read/write head if the WORF and/or PES information exceeds the threshold, the repairing including
        writing a new servo burst and subsequently trimming the new servo burst; and
        repairing a servo burst damaged by the new servo burst;
    calculating a second set of WORF and/or PES information for the one or more servo tracks; and
    storing the second set of WORF and/or PES information for retrieval during servowriting.

2. A method to support repairable servowriting, comprising:
    calculating wedge offset reduction field (WORF) and/or position error signal (PES) information for one or more servo tracks on a surface of a rotating medium;
    comparing the WORF and/or PES information for the one or more servo tracks with a pre-determined threshold;
    repairing a servo burst and/or a boundary of the servo burst on the one or more servo tracks via a read and/or write element of a read/write head if the WORF and/or PES information exceeds the threshold; and
    writing the WORF and/or PES information on the one or more servo tracks.

3. A system to support repairable servowriting, comprising:
    a rotatable medium including at least one surface having a plurality of servo tracks operable to store one or more servo bursts;
    a read/write head including a read and/or write element operable to servowrite the servo tracks; and
    one or more controllers operable to:
        rotate the rotatable medium and position the read/write head relative to the rotatable medium;
        calculate a first set of wedge offset reduction field (WORF) and/or position error signal (PES) information for one or more servo tracks on a surface of a rotating medium;
        compare the first set of WORF and/or PES information for the one or more servo tracks with a pre-determnined threshold; and
        repair a servo burst and/or a boundary of the servo burst on the one or more servo tracks via a read and/or write element of a read/write head if the WORF and/or PES information exceeds the threshold, the repair including writing a new servo burst and subsequently trimming the new servo burst and repairing a servo burst damaged by the new servo burst;
        calculate a second set of WORF and/or PES information for the one or more servo tracks; and
        store the second set of WORF and/or PES information for retrieval during servowriting.

4. The system according to claim 3, wherein:
    the rotatable medium is a magnetic disk, an optical disk, a laser-recordable disk, a disk in a single and/or multi-headed disk drive, or a rotating data storage device.

5. The system according to claim 3, wherein:
    the rotating medium includes one or more surfaces, wherein each of the one or more surfaces has one or more tracks.

6. A system to support repairable servowriting, comprising:
    a rotatable medium including at least one surface having a plurality of servo tracks operable to store one or more servo bursts;
    a read/write head including a read and/or write element operable to servowrite the servo tracks; and
    one or more controllers operable to:
        rotate the rotatable medium and position the read/write head relative to the rotatable medium;
        calculate wedge offset reduction field (WORF) and/or position error signal (PES) information for one or more servo tracks on a surface of a rotating medium;
        compare the WORF and/or PES information for the one or more servo tracks with a pre-determined threshold;
        repair a servo burst and/or a boundary of the servo burst on the one or more servo tracks via a read and/or write element of a read/write head if the WORF and/or PES information exceeds the threshold; and
        write the WORF and/or PES information on the one or more servo tracks.

7. The system according to claim 6, wherein:
    the rotatable medium is a magnetic disk, an optical disk, a laser-recordable disk, a disk in a single and/or multi-headed disk drive, or a rotating data storage device.

8. The system according to claim 6, wherein:
    the rotating medium includes one or more surfaces, wherein each of the one or more surfaces has one or more tracks.

* * * * *

UNITED STATES PATENT AND TRADEMARK OFFICE
CERTIFICATE OF CORRECTION

| | |
|---|---|
| PATENT NO. | : 7,298,568 B2 |
| APPLICATION NO. | : 11/082120 |
| DATED | : November 20, 2007 |
| INVENTOR(S) | : Richard M. Ehrlich et al. |

It is certified that error appears in the above-identified patent and that said Letters Patent is hereby corrected as shown below:

In Col. 15; Line 32, delete: "detennined" and replace with "determined".

Signed and Sealed this

Sixth Day of July, 2010

David J. Kappos
*Director of the United States Patent and Trademark Office*